United States Patent
Niu et al.

(10) Patent No.: US 12,317,322 B2
(45) Date of Patent: May 27, 2025

(54) MULTIPLE TRANSMISSION RECEPTION POINT (mTRP) ENHANCEMENT IN UNLICENSED

(71) Applicant: Apple Inc., Cupertino, CA (US)

(72) Inventors: Huaning Niu, San Jose, CA (US); Dawei Zhang, Saratoga, CA (US); Wei Zeng, Saratoga, CA (US); Haitong Sun, Cupertino, CA (US); Yushu Zhang, Beijing (CN); Hong He, San Jose, CA (US); Oghenekome Oteri, San Diego, CA (US); Weidong Yang, San Diego, CA (US); Seyed Ali Akbar Fakoorian, San Diego, CA (US); Sigen Ye, San Diego, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/775,915

(22) PCT Filed: Jun. 7, 2021

(86) PCT No.: PCT/CN2021/098648
§ 371 (c)(1),
(2) Date: May 11, 2022

(87) PCT Pub. No.: WO2022/256973
PCT Pub. Date: Dec. 15, 2022

(65) Prior Publication Data
US 2024/0155679 A1 May 9, 2024

(51) Int. Cl.
*H04W 74/08* (2024.01)
*H04L 1/00* (2006.01)
(Continued)

(52) U.S. Cl.
CPC ....... *H04W 74/0816* (2013.01); *H04L 1/0038* (2013.01); *H04W 72/1268* (2013.01); *H04W 74/006* (2013.01); *H04W 92/20* (2013.01)

(58) Field of Classification Search
CPC ..... H04W 74/08; H04W 74/00; H04W 72/12; H04W 72/04; H04W 72/14; H04W 72/21;
(Continued)

(56) References Cited

U.S. PATENT DOCUMENTS 11,140,579 B2 * 10/2021 Salem ................... H04W 28/16
11,246,159 B2 * 2/2022 Garcia .................. H04W 76/11
(Continued)

FOREIGN PATENT DOCUMENTS

CN 112586059 A 3/2021
WO 2020063577 A1 4/2020
(Continued)

OTHER PUBLICATIONS

International Preliminary Report on Patentability dated Nov. 21, 2023 in connection with PCT Application No. PCT/CN2021/098648.
(Continued)

*Primary Examiner* — Man U Phan
(74) *Attorney, Agent, or Firm* — Eschweiler & Potashnik, LLC; Ningjiao Zhang

(57) ABSTRACT

A user equipment (UE), a base station (e.g., next generation NodeB (gNB)), or other network component can operate to configure multiple transmission reception point (mTRP) communication for new radio (NR) unlicensed (NR-U) standalone communications in a network. A processor or processing circuitry can acquire or share a channel occupancy time (COT) for a first transmission reception point (TRP). The COT can then be mediated with a UE or a second TRP via an ideal backhaul or an ideal backhaul based on a
(Continued)

proximity condition. The COT can be shared between the first and second TRP via X2 signaling over an X2 interface.

24 Claims, 8 Drawing Sheets

(51) Int. Cl.
| | |
|---|---|
| *H04W 72/1268* | (2023.01) |
| *H04W 74/00* | (2009.01) |
| *H04W 74/0816* | (2024.01) |
| *H04W 92/20* | (2009.01) |

(58) Field of Classification Search
CPC ..... H04W 72/23; H04W 72/51; H04W 76/27; H04W 76/28; H04W 92/18; H04W 92/20; H04W 64/00; H04W 80/02; H04W 16/14; H04L 1/00; H04L 5/00; H04L 27/00; H04L 27/26; H04B 7/02; H04B 7/06
USPC ........................................... 370/329
See application file for complete search history.

(56) References Cited

U.S. PATENT DOCUMENTS

| | | | | |
|---|---|---|---|---|
| 11,375,490 | B2 * | 6/2022 | Kwak | H04L 5/0053 |
| 11,540,254 | B2 * | 12/2022 | Bang | H04W 72/0446 |
| 11,589,388 | B2 * | 2/2023 | Luo | H04W 16/14 |
| 11,838,895 | B2 * | 12/2023 | Chen | H04W 72/02 |
| 11,856,603 | B2 * | 12/2023 | Luo | H04W 72/23 |
| 11,877,181 | B2 * | 1/2024 | Zhang | H04W 16/14 |
| 11,968,689 | B2 * | 4/2024 | Kwak | H04W 72/23 |
| 12,075,476 | B2 * | 8/2024 | Yao | H04W 72/1268 |
| 12,081,290 | B2 * | 9/2024 | Miao | H04B 7/024 |
| 12,088,516 | B2 * | 9/2024 | Mondal | H04L 5/0035 |
| 2023/0345533 | A1 * | 10/2023 | Cui | H04L 5/0053 |

FOREIGN PATENT DOCUMENTS

| | | | |
|---|---|---|---|
| WO | 2020146502 | A1 | 7/2020 |
| WO | 2020168320 | A1 | 8/2020 |

OTHER PUBLICATIONS

PCT Search Report dated Feb. 17, 2022 in connection with PCT Application No. PCT/CN2021/098648.
PCT Written Opinion dated Feb. 25, 2022 in connection with PCT Application No. PCT/CN2021/098648.
ZTE, Sanechips R1-1909972; Considerations on DL reference signals and channels design for NR-U 3GPP TSG RAN WG1 Meeting #98bis; Oct. 7, 2019.
Huawei, Hisilicon R1-1812194; Coexistence and channel access for NR unlicensed band operations 3GPP TSG RAN WG1 Meeting #95; Nov. 3, 2018.
ETRI R1-2006357; On processing time for sahred COT acquisition for unlicensed URLLC in FBE 3GPP TSG RAN WG1 #102-e; Aug. 7, 2020.
Coordinated AP Time/Frequency Sharing in a Transmit Opportunity in 11be; IEEE 802.11-19/1582r2; Jan. 2020.

* cited by examiner

MULTIPLE TRANSMISSION RECEPTION POINT (mTRP) ENHANCEMENT IN UNLICENSED

This application is a National Phase entry application of International Patent Application No. PCT/CN2021/098648 filed Jun. 7, 2021, entitled "MULTIPLE TRANSMISSION RECEPTION POINT (mTRP) ENHANCEMENT IN UNLICENSED", the contents of which are herein incorporated by reference in their entirety.

FIELD

This disclosure relates to wireless communication networks including enhancements for enabling multiple transmission reception point (mTRP) communication within a wireless network in unlicensed spectrum.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes configuring multiple transmission and reception point (mTRP) usage in new radio (NR) unlicensed (NR-U) standalone to achieve high reliability, low latency, improved mobility, and wider/larger coverage in order to enable a wider adoption in 3GPP technology.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

Figure 1:
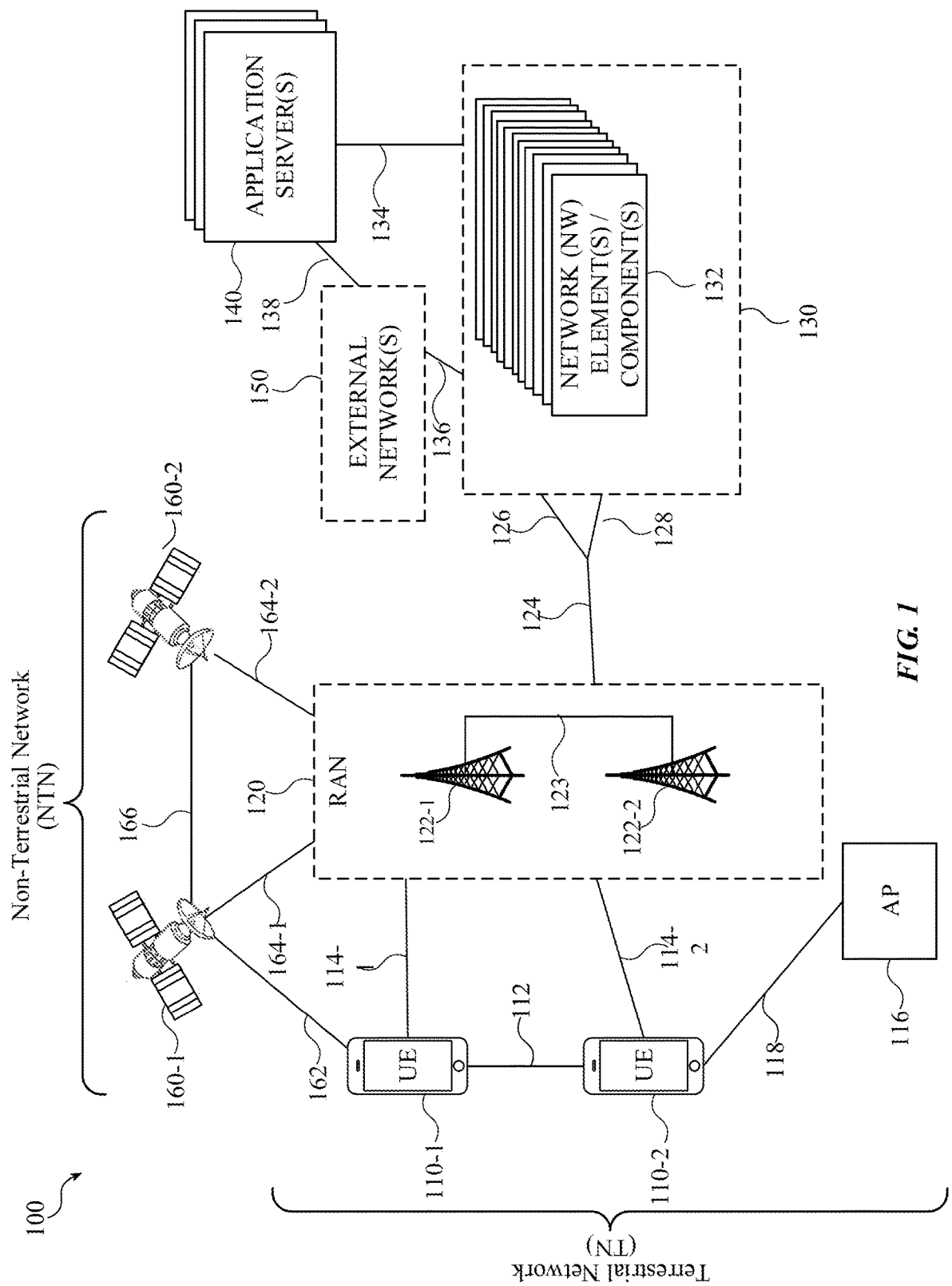
FIG. 1 is a block diagram illustrating an architecture of a system including a Core Network (CN), for example a Fifth Generation (5G) CN (5GC), in accordance with various aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), or firmware. For example, a component can be a processor (e.g., a microprocessor, a controller, or other processing device), a process running on a processor, a controller, an object, an executable, a program, a storage device, a computer, a tablet PC or a user equipment (e.g., mobile phone, etc.) with a processing device. By way of illustration, an application running on a server and the server can also be a component. One or more components can reside within a process, and a component can be localized on one computer or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local or remote processes such as in accordance with a signal having one or more data packets (e.g., data from one component interacting with another component in a local system, distributed system, or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of the above, various aspects/embodiments are disclosed for enhancing multiple transmission reception point (mTRP) communications in a network to provide wider adoption of 3GPP technology with WiFi. A channel occupancy time (COT) can be shared among multiple TRPs for communications in a 6 GHz band and 60 GHz bands or greater than 60 GHz. A user equipment (UE) can operate to acquire a COT as a COT owner, or a TRP of an access node (AN) or of a base station (e.g., a next generation NodeB (gNB)) can acquire the COT to be the COT owner. The COT can then be shared by mediating the COT to one or more TRPs or UEs, for example, as access points that can continue sharing the COT for ongoing transmissions over the network in order to improve low latency and high reliability, along with improved mobility and larger coverage, especially with multiple-input multiple output (MIMO) devices or other network devices. Such COT sharing can be enabled via an ideal coordination or a non-ideal coordination among network devices (e.g., gNBs, UEs, other TRPs, or the like). For example, a TRP acquire a COT via a Load Based Equipment (LBE) access or a Frame Based Equipment (FBE) access and share the COT with another TRP based on an mTRP configuration of a UE. The COT can be shared via X2 signalling of an X2 interface to another TRP as between gNBs, for example.

Additional aspects and details of the disclosure are further described below with reference to figures.

Aspects described herein can be implemented into a system using any suitably configured hardware or software. Referring to FIG. 1, illustrated is an example network 100, according to various aspects discussed herein. Example network 100 can include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 can include a non-terrestrial network (NTN) comprising one or more satellites 160 (e.g., of a global navigation satellite system (GNSS)) in communication with UEs 110 and RAN 120.

The systems and devices of example network 100 can operate in accordance with one or more communication standards, such as 2nd generation (2G), 3rd generation (3G), 4th generation (4G) (e.g., long-term evolution (LTE)), 5th generation (5G) (e.g., new radio (NR)) communication standards of the 3rd generation partnership project (3GPP). Additionally, or alternatively, one or more of the systems and devices of network 100 can operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 can include smartphones (e.g., handheld touchscreen mobile computing devices connectable to one or more wireless communication networks). Additionally, or alternatively, UEs 110 can include other types of mobile or non-mobile computing devices capable of wireless communications, such as personal data assistants (PDAs), pagers, laptop computers, desktop computers, wireless handsets, etc. In some implementations, UEs 110 can include internet of things (IoT) devices (or IoT UEs) that can comprise a network access layer designed for low-power IoT applications utilizing short-lived UE connections. Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data can be a machine-initiated exchange, and an IoT network can include interconnecting IoT UEs (which can include uniquely identifiable embedded computing devices within an Internet infrastructure) with short-lived connections. In some scenarios, IoT UEs can execute background applications (e.g., keep-alive messages, status updates, etc.) to facilitate the connections of the IoT network.

UEs 110 can communicate and establish a connection with (e.g., be communicatively coupled) with RAN 120 or other transmission reception points (TRPs), which can involve one or more wireless channels 114-1 and 114-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes (e.g., 122-1 and 122-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 130. Additionally, at least one of the MN or the SN can be operated with shared spectrum channel access, and functions specified for UE 110 can be used for an integrated access and backhaul mobile termination (IAB-MT). Similar for UE 101, the IAB-MT can access the network using either one network node or using two different nodes with enhanced dual connectivity (EN-DC) architectures, new radio dual connectivity (NR-DC) architectures, or the like.

As shown, UE 110 can also, or alternatively, connect to access point (AP) 116 via interface 118, which can include an air interface enabling UE 110 to communicatively couple with AP 116. AP 116 can comprise a wireless local area network (WLAN), WLAN node, WLAN termination point, transmission reception points (TRPs), etc. The connection 1207 can comprise a local wireless connection, such as a connection consistent with any IEEE 702.11 protocol, and AP 116 can comprise a wireless fidelity (Wi-Fi®) router or other AP. While not explicitly depicted in FIG. 1, AP 116 can be connected to another network (e.g., the Internet) without connecting to RAN 120 or CN 130. In some scenarios, UE 110, RAN 120, and AP 116 can be configured to utilize LTE-WLAN aggregation (LWA) techniques or LTE WLAN radio level integration with IPsec tunnel (LWIP) techniques. LWA can involve UE 110 in RRC_CONNECTED being configured by RAN 120 to utilize radio resources of LTE and WLAN. LWIP can involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling can include encapsulating the entirety of original IP packets and adding a new packet header, thereby protecting the original header of the IP packets.

The connections 114 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In embodiments, the UEs 101 can directly exchange communication data via a ProSe interface 112. The ProSe interface 112 can alternatively be referred to as a SL interface 112 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

RAN 120 can include one or more RAN nodes 122-1 and 122-2 (referred to collectively as RAN nodes 122, and individually as RAN node 122) that enable the connections 114-1 and 114-2 to be established between UEs 110 and RAN 120. RAN nodes 122 can include network access points configured to provide radio baseband functions for data or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). As a gNB 120, the RAN 120 can comprise one or more Distributed Units/Components (DU(s)) and a Central Unit/Components (CU)) and communicatively couple to CN 130 as a 5GC via satellite 160. The DU(s) and CU can be separated out from one another geographically, for example, and a CU can control multiple DUs to enable one or more DUs to be placed closer to the UE 110 with connectivity to the CU as an S1 interface, for example, as a gNB on-board based station, in which at least a part of the gNB 120 as a system or device is located on the satellite 160. Instead of placing an entire gNB 120 on a satellite 160, in an aspect, an architecture can have a component of the gNB 120 (e.g., the DU) located on satellite 160. The components of the gNB therefore can be directly connected to the processing circuitry of the satellite 160, while being communicatively coupled to the CU at a ground level gNB part. In these instances, the satellite 160 can be configured for inter-satellite communicate with other satellites. Any one or more of the satellites/gNB 5GC architectures herein can be configured to various aspects/embodiments, in which the satellite 160 can communicate through gateways connected to the internet. Such architectures can enable 3GPP to further utilize communications via the internet back in a coordinated connection between both satellite 160 and core network 130.

RAN nodes 122 can include a roadside unit (RSU), a transmission reception point (TRxP or TRP), and one or more other types of ground stations (e.g., terrestrial access points). In some scenarios, RAN node 122 can be a dedicated physical device, such as a macrocell base station, or a low power (LP) base station for providing femtocells, picocells or other like having smaller coverage areas, smaller user capacity, or higher bandwidth compared to macrocells. As described below, in some implementations, satellites 160 can operate as base stations (e.g., RAN nodes 122) with respect to UEs 110. As such, references herein to a base station, RAN node 122, etc., can involve implementations where the base station, RAN node 122, etc., is a terrestrial network node and also to implementation where the base station, RAN node 122, etc., is a non-terrestrial network (NTN) node (e.g., satellite 160).

Some or all of RAN nodes 120 can be implemented as one or more software entities running on server computers as part of a virtual network, which can be referred to as a centralized RAN (CRAN) or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 122; a media access control (MAC)/physical (PHY) layer split wherein RRC, PDCP, radio link control (RLC), and MAC layers can be operated by the CRAN/vBBUP and the PHY layer can be operated by individual RAN nodes 122, or a "lower PHY" split wherein RRC, PDCP, RLC, MAC layers and upper portions of the PHY layer can be operated by the CRAN/vBBUP and lower portions of the PHY layer can be operated by individual RAN nodes 122. This virtualized framework can allow freed-up processor cores of RAN nodes 122 to perform or execute other virtualized applications.

In some implementations, an individual RAN node 122 can represent individual gNB-distributed units (DUs) connected to a gNB-control unit (CU) via individual F1 interfaces. In such implementations, the gNB-DUs can include one or more remote radio heads or radio frequency (RF) front end modules (RFEMs), and the gNB-CU can be operated by a server (not shown) located in RAN 120 or by a server pool (e.g., a group of servers configured to share resources) in a similar manner as the CRAN/vBBUP. Additionally, or alternatively, one or more of RAN nodes 120 can be next generation eNBs (i.e., gNBs) that can provide evolved universal terrestrial radio access (E-UTRA) user plane and control plane protocol terminations toward UEs 110, and that can be connected to a 5G core network (5GC) 130 via an NG interface.

Any of the RAN nodes 122 can terminate an air interface protocol and can be the first point of contact for UEs 110. In some implementations, any of the RAN nodes 122 can fulfill various logical functions for the RAN 120 including, but not limited to, radio network controller (RNC) functions such as radio bearer management, uplink and downlink dynamic radio resource management and data packet scheduling, and mobility management. UEs 110 can be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations are not necessarily limited in this regard. The OFDM signals can comprise a plurality of orthogonal subcarriers.

In some implementations, a downlink resource grid can be used for downlink transmissions from any of the RAN nodes 122 to UEs 110, and uplink transmissions can utilize similar techniques. The grid can be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block can comprise a collection of resource elements (REs); in the frequency domain, this can represent the smallest quantity of resources that currently can be allocated. There are several different physical downlink channels that are conveyed using such resource blocks.

Further, RAN nodes 122 can be configured to wirelessly communicate with UEs 110, or one another, over a licensed medium (also referred to as the "licensed spectrum" or the "licensed band"), an unlicensed shared medium (also referred to as the "unlicensed spectrum" or the "unlicensed band"), or combination thereof. A licensed spectrum can include channels that operate in the frequency range of approximately 400 MHz to approximately 3.8 GHz, whereas the unlicensed spectrum can include the 5/6 GHz band or a 60 GHZ band or greater (e.g., up to 71 GHz). A licensed spectrum can correspond to channels or frequency bands selected, reserved, regulated, etc., for certain types of wireless activity (e.g., wireless telecommunication network activity), whereas an unlicensed spectrum can correspond to one or more frequency bands that are not restricted for certain types of wireless activity. Whether a particular frequency band corresponds to a licensed medium or an unlicensed medium can depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 can operate using licensed assisted access (LAA), eLAA, or feLAA mechanisms. In these implementations, UEs 110 and the RAN nodes 122 can perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5/6 GHz band are WLANs based on IEEE 802.11 technologies. WLAN employs a contention-based channel access mechanism, called CSMA/CA. Here, when a WLAN node (e.g., a mobile station (MS) such as UE 110, AP 116, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH), or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (μs); however, the size of the CWS and a maximum channel occupancy time (MCOT) (for example, a transmission burst) can be based on governmental regulatory requirements.

The LAA mechanisms can be built upon carrier aggregation (CA) technologies of LTE-Advanced systems. In CA, each aggregated carrier is referred to as a component carrier (CC). In some cases, individual CCs can have a different bandwidth than other CCs. In time division duplex (TDD) systems, the number of CCs as well as the bandwidths of each CC can be the same for DL and UL. CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require UE 110 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH can carry user data and higher layer signaling to UEs 110. The physical downlink control channel (PDCCH) can carry information about the transport format and resource allocations related to the PDSCH channel, among other things. The PDCCH can also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) can be performed at any of the RAN nodes 122 based on channel quality information fed back from any of UEs 110. The downlink resource assignment information can be sent on the PDCCH used for (e.g., assigned to) each of UEs 110.

The PDCCH uses control channel elements (CCEs) to convey the control information, wherein a number of CCEs (e.g., 6 or the like) can include of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four quadrature phase shift keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, 8, or 16).

Some implementations can use concepts for resource allocation for control channel information that are an extension of the above-described concepts. For example, some implementations can utilize an extended (E)-PDCCH that uses PDSCH resources for control information transmission. The EPDCCH can be transmitted using one or more ECCEs. Similar to the above, each ECCE can correspond to nine sets of four physical resource elements known as an EREGs. An ECCE can have other numbers of EREGs in some situations.

The RAN nodes 122 can be configured to communicate with one another via interface 123. In implementations where the system 100 is an LTE system, interface 123 can be an X2 interface. The X2 interface can be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface can include an X2 user plane interface (X2-U) and an X2 control plane interface (X2-C). The X2-U can provide flow control mechanisms for user data packets transferred over the X2 interface and can be used to communicate information about the delivery of user data between eNBs or gNBs. For example, the X2-U can provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C can provide intra-LTE access mobility functionality (e.g., including context transfers from source to target eNBs, user plane transport control, etc.), load management functionality, and inter-cell interference coordination functionality.

In embodiments where the system 100 is a 5G or NR system, the interface 123 can be an Xn interface 123. The Xn interface is defined between two or more RAN nodes 122 (e.g., two or more gNBs and the like) that connect to 5GC 130, between a RAN node 122 (e.g., a gNB, or TRP) connecting to 5GC 130 and an gNB, and/or between two gNBs or TRPs connecting to 5GC 130. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 110 in a connected mode (e.g., CM-CONNECTED) including functionality to manage the UE mobility for connected mode between one or more RAN nodes 122. The mobility support can include context transfer from an old (source) serving RAN node 122 to new (target) serving RAN node 122; and control of user plane tunnels between old (source) serving RAN node 122 to new (target) serving RAN node 122. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

As shown, RAN 120 can be connected (e.g., communicatively coupled) to CN 130. CN 130 can comprise a plurality of network elements 132, which are configured to offer various data and telecommunications services to customers/subscribers (e.g., users of UEs 110) who are connected to the CN 130 via the RAN 120. In some implementations, CN 130 can include an evolved packet core (EPC), a 5G CN, or one or more additional or alternative types of CNs. The components of the CN 130 can be implemented in one physical node or separate physical nodes including components to read and execute instructions from a machine-readable or computer-readable medium (e.g., a non-transitory machine-readable storage medium). In some implementations, network function virtualization (NFV) can be utilized to virtualize any or all the above-described network node roles or functions via executable instructions stored in one or more computer-readable storage mediums (described in further detail below). A logical instantiation of the CN 130 can be referred to as a network slice, and a logical instantiation of a portion of the CN 130 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, CN 130, application servers (ASs) 140, and external networks 150 can be connected to one another via interfaces 134, 136, and 138, which can include IP network interfaces. Application servers 140 can include one or more server devices or network elements (e.g., virtual network functions (VNFs) offering applications that use IP bearer resources with CM 130 (e.g., universal mobile telecommunications system packet services (UMTS PS) domain, LTE PS data services, etc.). Application server 140 can also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 can include one or more of a variety of networks, including the Internet, thereby providing the mobile communication network and UEs 110 of the network access to a variety of additional services, information, interconnectivity, and other network features.

As shown, example network 100 can include an NTN that can comprise one or more satellites 160-1 and 160-2 (collectively, "satellites 160"). Satellites 160 can be in communication with UEs 110 via service link or wireless interface 162 or RAN 120 via feeder links or wireless interfaces 164 (depicted individually as 164-1 and 164). In some implementations, satellite 160 can operate as a passive or transparent network relay node regarding communications between UE 110 and the terrestrial network (e.g., RAN 120). In some implementations, satellite 160 can operate as an active or regenerative network node such that satellite 160 can operate as a base station to UEs 110 (e.g., as a gNB of RAN 120) regarding communications between UE 110 and RAN 120. In some implementations, satellites 160 can communicate with one another via a direct wireless interface (e.g., 166) or an indirect wireless interface (e.g., via RAN 120 using interfaces 164-1 and 164-2). Additionally, or alternatively, satellite 160 can include a GEO satellite, LEO satellite, or another type of satellite. Satellite 160 can also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 can operate as bases stations (e.g., RAN nodes 122) with respect to UEs 110. As such, references herein to a base station, RAN node 122, etc., can involve implementations where the base station, RAN node 122, etc., is a terrestrial network node and implementation, where the base station, RAN node 122, etc., is a non-terrestrial network node (e.g., satellite 160).

Core NW elements/components can include one or more of the following functions and network components: an Authentication Server Function (AUSF); an Access and Mobility Management Function (AMF); a Session Management Function (SMF); a Network Exposure Function (NEF); a Policy Control Function (PCF); a Network Repository Function (NRF); a Unified Data Management (UDM); an Application Function (AF); a User Plane (UP) Function (UPF); and a Network Slice Selection Function (NSSF).

Figure 2:
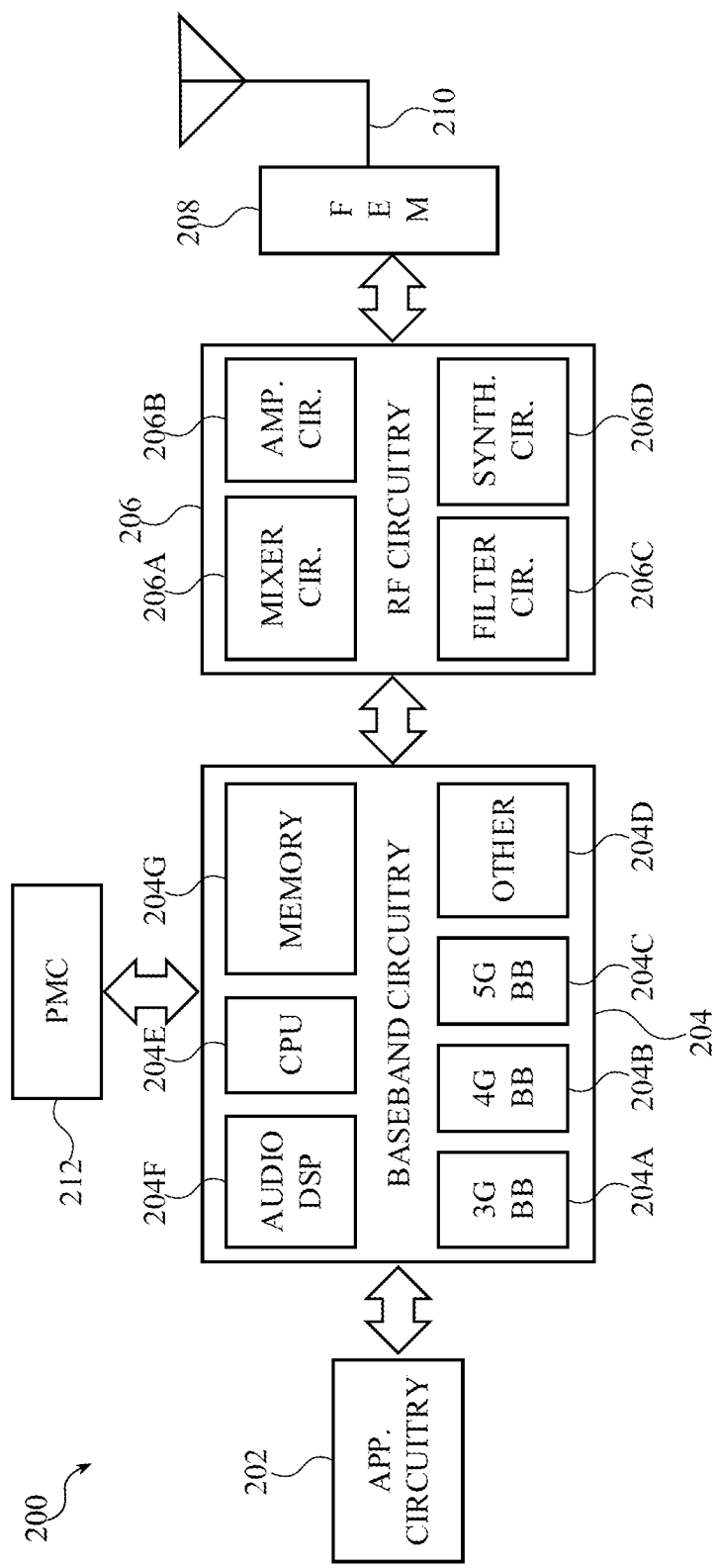
FIG. 2 is a diagram illustrating example components of a device that can be employed in accordance with aspects discussed herein.

FIG. 2 illustrates example components of a device 200 in accordance with some aspects. In some aspects, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE 110 or a RAN node 120. In some aspects, the device 200 can include fewer elements (e.g., a RAN node could not utilize application circuitry 202, and instead include a processor/controller to process IP data received from a CN such as 5GC 120 or an Evolved Packet Core (EPC)). In some aspects, the device 200 can include additional elements such as, for example, memory/storage, display, camera, sensor (including one or more temperature sensors, such as a single temperature sensor, a plurality of temperature sensors at different locations in device 200, etc.), or input/output (I/O) interface. In other aspects, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some aspects, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some aspects, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other aspects, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some aspects, modulation/demodulation circuitry of the baseband circuitry 204 can include Fast-Fourier Transform (FFT), precoding, or constellation mapping/demapping functionality. In some aspects, encoding/decoding circuitry of the baseband circuitry 204 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 204 can include one or more audio digital signal processor(s) (DSP) 204F. The audio DSP(s) 204F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 204 and the application circuitry 202 can be implemented together such as, for example, on a system on a chip (SOC).

In some aspects, the baseband circuitry 204 can provide for communication compatible with one or more radio technologies. For example, in some aspects, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Aspects in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various aspects, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some aspects, the receive signal path of the RF circuitry 206 can include mixer circuitry 206a, amplifier circuitry 206b and filter circuitry 206c. In some aspects, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some aspects, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some aspects, the output baseband signals can be zero-frequency baseband signals, although this is not a requirement. In some aspects, mixer circuitry 206a of the receive signal path can comprise passive mixers, although the scope of the aspects is not limited in this respect.

In some aspects, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some aspects, the mixer circuitry 206a of the receive signal path and the mixer circuitry 206a of the transmit signal path can include two or more mixers and can be arranged for quadrature downconversion and upconversion, respectively. In some aspects, the mixer circuitry 206a of the receive signal path and the mixer circuitry 206a of the transmit signal path can include two or more mixers and can be arranged for image rejection (e.g., Hartley image rejection). In some aspects, the mixer circuitry 206a of the receive signal path and the mixer circuitry 206a can be arranged for direct downconversion and direct upconversion, respectively. In some aspects, the mixer circuitry 206a of the receive signal path and the mixer circuitry 206a of the transmit signal path can be configured for super-heterodyne operation.

In some aspects, the output baseband signals, and the input baseband signals can be analog baseband signals, although the scope of the aspects is not limited in this respect. In some alternate aspects, the output baseband signals, and the input baseband signals can be digital baseband signals. In these alternate aspects, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode aspects, a separate radio IC circuitry can be provided for processing signals for each spectrum, although the scope of the aspects is not limited in this respect.

In some aspects, the synthesizer circuitry 206d can be a fractional-N synthesizer or a fractional N/N+1 synthesizer, although the scope of the aspects is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some aspects, the synthesizer circuitry 206d can be a fractional N/N+1 synthesizer.

In some aspects, frequency input can be provided by a voltage controlled oscillator (VCO), although that is not a requirement. Divider control input can be provided by either the baseband circuitry 204 or the applications processor 202 depending on the desired output frequency. In some aspects, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various aspects, the amplification through the transmit or receive signal paths can be done solely in the RF circuitry 206, solely in the FEM 208, or in both the RF circuitry 206 and the FEM 208.

In some aspects, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other aspects, the PMC 212 can be additionally or alternatively coupled with, and perform similar power management operations for, other components such as, but not limited to, application circuitry 202, RF circuitry 206, or FEM 208.

In some aspects, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC Idle state, where it disconnects from the network and does not perform operations such as channel quality feedback, handover, etc. The device 200 goes into a very low power state and it performs paging where again it periodically wakes up to listen to the network and then powers down again. The device 200 could potentially not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
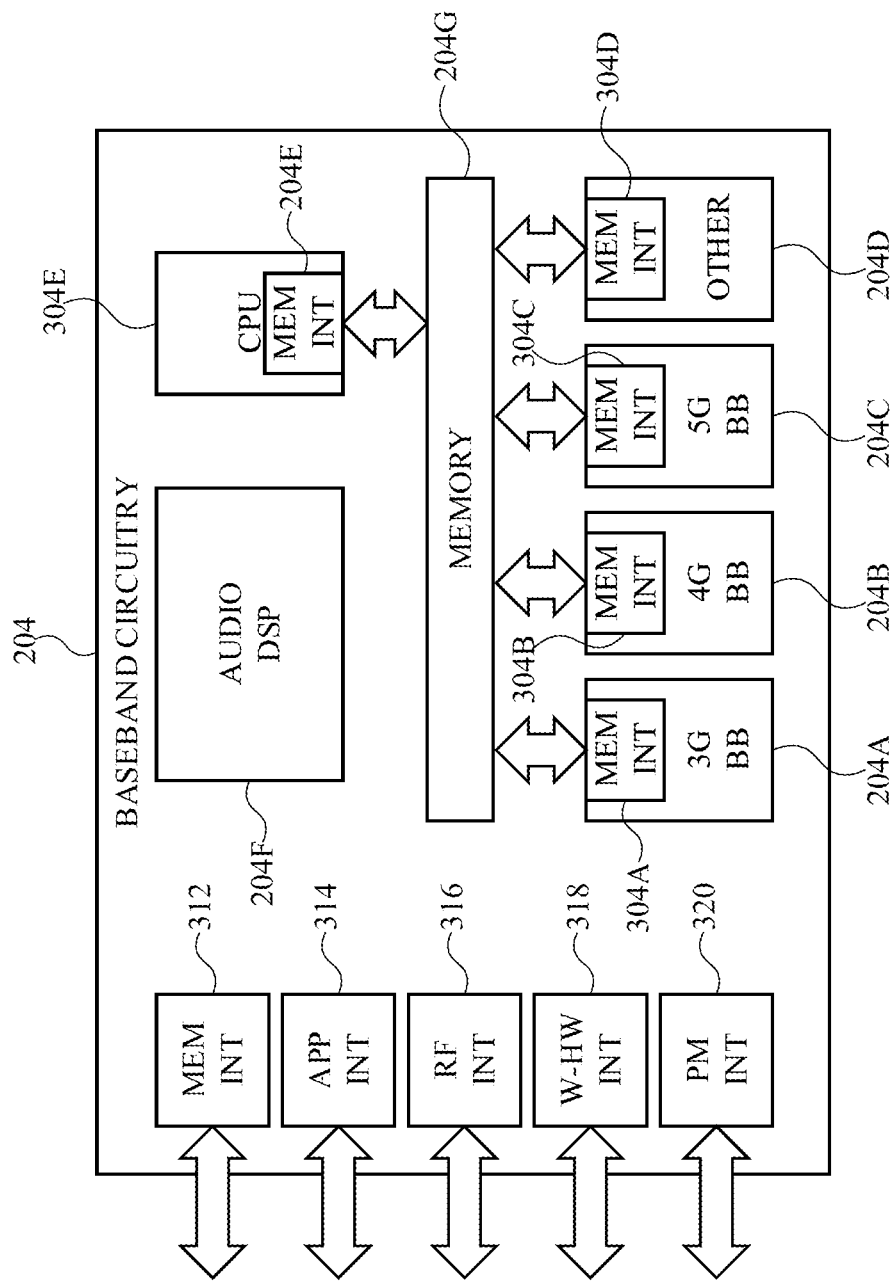
FIG. 3 is a diagram illustrating example interfaces of baseband circuitry that can be employed in accordance with aspects discussed herein.

FIG. 3 illustrates example interfaces of baseband circuitry in accordance with some aspects. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
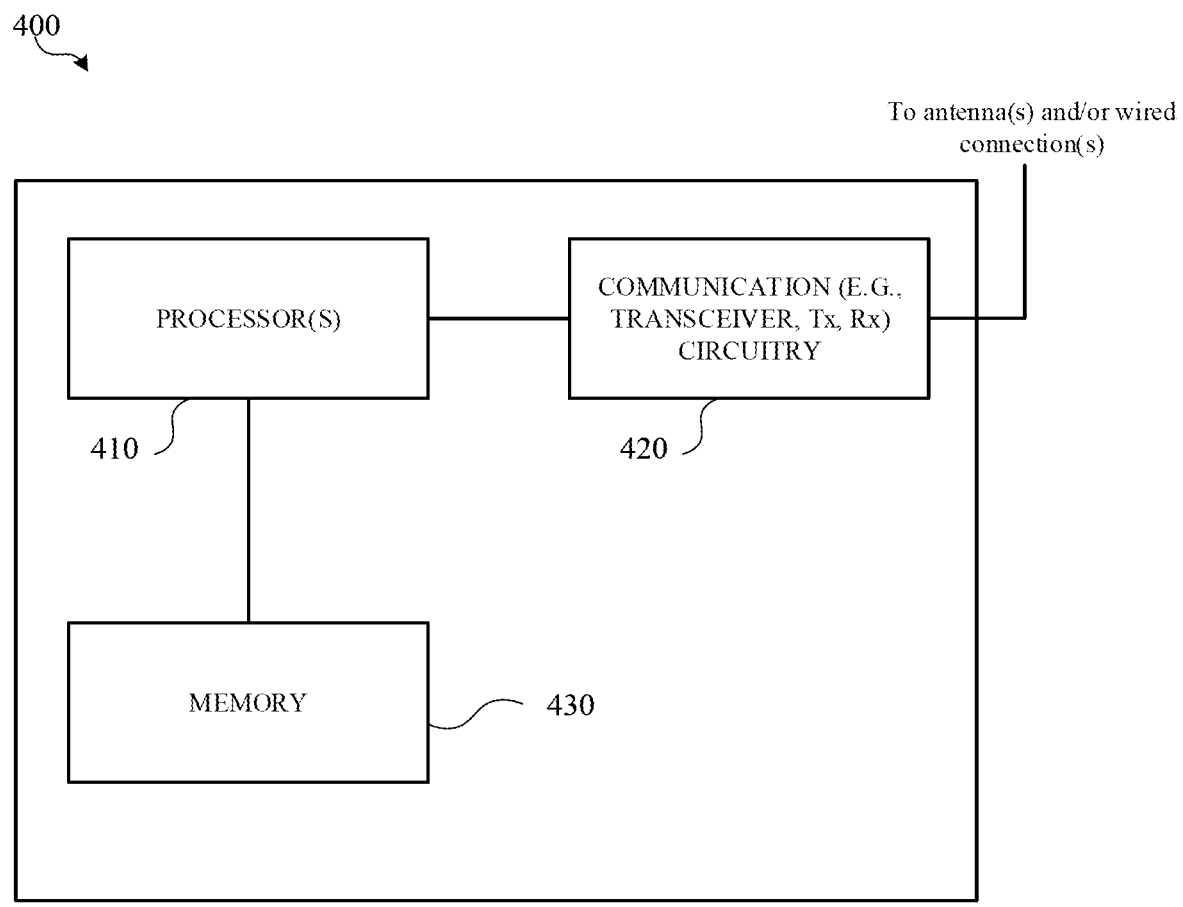
FIG. 4 is an exemplary a simplified block diagram of a user equipment (UE) wireless communication device or other network device/component (e.g., gNB) in accordance with various aspects described.

Referring to FIG. 4, illustrated is a block diagram of a system 400 employable at a UE 110, a Base Station (BS) 120 (e.g., a next generation Node B (gNodeB or gNB), evolved Node B (eNB), NTN node 160, or other BS (base station)/TRP (Transmit/Receive Point)) 122-1, 122-2, an Access and Mobility Management Function (AMF) or another component of a 3GPP (Third Generation Partnership Project) network (e.g., a 5GC (Fifth Generation Core Network)) component or function such as a AMF (Access and Mobility Management Function)) that facilitates cell selection or reselection for a UE 110 able to connect to one or more Non-Terrestrial Networks (NTNs), according to various aspects discussed herein. System 400 can include processor(s) 410, communication circuitry 420, and memory 430. Processor(s) 410 (e.g., which can comprise one or more of 202 or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example, circuitry for wired or wireless connection(s) (e.g., 206 or 208), which can include transmitter circuitry (e.g., associated with one or more transmit chains) or receiver circuitry (e.g., associated with one or more receive chains), wherein transmitter circuitry and receiver circuitry can employ common or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile or non-volatile according to any of a variety of technologies/constructions, etc.), and can store instructions or data associated with one or more of processor(s) 410 or transceiver circuitry 420).

Specific types of aspects of system 400 (e.g., UE aspects, etc.) can be indicated via subscripts (e.g., system 400$_{UE}$ comprising processor(s) 410$_{UE}$, communication circuitry 420$_{UE}$, and memory 430$_{UE}$). In some aspects, such as BS aspects (e.g., system 400$_{BS}$) and network component (e.g., AMF, etc.) aspects (e.g., system 400$_{AMF}$) processor(s) 410$_{BS}$ (etc.), communication circuitry (e.g., 420$_{BS}$, etc.), and memory (e.g., 430$_{BS}$, etc.) can be in a single device or can be included in different devices, such as part of a distributed architecture. In aspects, signaling or messaging between different aspects of system 400 (e.g., 400$_1$ and 400$_2$) can be generated by processor(s) 410$_1$, transmitted by communication circuitry 420$_1$ over a suitable interface or reference point (e.g., a 3GPP air interface, N1, N8, N11, N22, etc.), received by communication circuitry 420$_2$, and processed by processor(s) 410$_2$. Depending on the type of interface, additional components (e.g., antenna(s), network port(s), etc. associated with system(s) 400$_1$ and 400$_2$) can be involved in this communication.

In various aspects, one or more of information (e.g., system information, resources associated with signaling, etc.), features, parameters, etc. can be configured to a UE 400$_{UE}$ via signaling (e.g., Access Stratum (AS) signaling, Non-Access Stratum (NAS)) originating from or routed through a Base Station (e.g., gNB, etc.) or other access point (e.g., via signaling generated by processor(s) 410$_{BS}$, transmitted by communication circuitry 420$_{BS}$, received by communication circuitry 420$_{UE}$, and processed by processor(s) 410$_{UE}$). Depending on the type of information, features, parameters, etc., the type of signaling employed or the exact details of the operations performed at the UE or BS in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

Various aspects or embodiments are further described below according to ideal or non-ideal backhaul coordination for COT sharing. Various aspects can include enhancing mTRP in MIMO or unlicensed communications via a network device as described herein. A UE 110 or gNB 122, for example, can share a channel occupancy time (COT) for NR-U standalone communication with one or more TRPs. Sharing the COT with other TRPs can include acquiring the COT via an LBT, or for unlicensed access a Load Based Equipment (LBE) access operation as a CCA or a Frame Based Equipment (FBE) access as a CCA.

The UE 110, gNB 122-1, or 122-2, for example, can operate to acquire an unlicensed spectrum in frequency range 1 (FR1) as a 5/6 GHz band, or alternatively 60 GHz band or greater (e.g., up to 71 GHz) via one or more CCA operations used for contention for the band. If successful, UE 110, gNB 122-1, or 122-2 becomes the COT owner for use of the COT in transmissions. As a part of becoming the COT owner, the UE 110, gNB 122-1, or 122-2 can share the COT with one or more TRPs (e.g., gNB 122-1, or 122-2). The COT owner can then mediate or control the sharing of the COT between itself and another TRP together for UL or DL transmission during the COT of the NR-U or other band.

The COT owner in NR can be configured to support dynamic time division duplexing (TDD), where the uplink-downlink allocation can change over time to adapt to traffic conditions. To enable dynamic TDD, a wireless device determines when and where to transmit and receive based on an indication of a COT configuration structure. The COT comprises multiple slots and each slot comprises downlink resources, uplink resources, or flexible resources. The COT structure reduces power consumption and channel access delay and COT sharing can increase reliability, lower latency, improve mobility and provide a larger coverage for network devices (e.g., UEs, gNBs, or other network components).

LAA can have a maximum COT based on access priority, which can be a maximum continuous transmission time after channel sensing via CCA or LBT procedure. In NR-Unlicensed or NR-U standalone communication, the COT owner can transmit its data payload by engaging in LBT, LBE or FBE and acquiring a COT, where the transmitter device can use the time resource inside the COT by transmitting its own data payload or share the resource with other devices or TRPs as a part of COT sharing. A maximum COT can depend on the data being transmitted (e.g., up to 8 or 10 ms). In some aspects, if a gNB acquires a COT, the gNB can use the entire resource inside the COT. Therefore, the other devices that can receive the DL gNB signal (e.g., unicast or broadcast) cannot transmit any data during the COT unless the gNB shares the COT with the other devices. It can thus be beneficial for the gNB to indicate the COT information to other devices (e.g., UEs or other TRPs). Such an indication can include the length of the COT or how to share the COT with other devices as a part of mediating the COT between its own demands for transmission and other TRPs or UEs, so that the other devices are able to sleep during the COT, or can transmit if the COT is shared by the gNB with one or more of the other devices.

In various aspects, the DCI, specifically DCI format 2_0, can be used to indicate the COT to the UE within the cell. DCI format 2_0 can be configured for indicating the slot format to UEs, but can instead be used for the indication that the COT is single TRP COT or mTRP COT with some format modifications. DCI format 2_0 can be transmitted via a physical channel (e.g., PDCCH) for a set of UEs in a cell. The PDCCH can indicate at least the slot format related information, such as which symbols in a slot are used for DL (D), UL (U), or are flexible (X), for example.

In an aspect, a COT owner can operate to mediate the COT by sharing the COT resources with another TRP or network device; referred to herein as COT sharing. Mediating the COT can include coordinating the resources of the COT by signaling them to a TRP for COT sharing. This signaling can be over a backhaul that includes an ideal backhaul or a non-ideal backhaul. The backhaul of a cell network can be a mobile backhaul that connects a cell to the core network (e.g., CN 130). An ideal backhaul, for example, can be a predefined latency one way such as less than or about 2.5 microseconds, with a throughput of up to about 10 Gbs, for example; any other backhaul can be considered a non-ideal backhaul, while such parameters are not necessarily fixed or limited to such, but can be pre-defined according to standard specification. Other parameters can be used as well for defining an ideal backhaul such as whether a remote ratio head can be carried to a base station link, in which a non-ideal backhaul can be where one network node provides NR access and the other network node provides either E-UTRA for LTE or NR access for 5G.

In an aspect, COT sharing can be conditioned on one or more conditions. The conditions, for example, can include a proximity condition. COT sharing with an ideal backhaul between one or more TRPs can be a function of the proximity condition so that COT sharing through backhaul only shares the COT to a nearby access point (AP). The proximity condition can be defined based on a UE mTRP configuration. Here, the COT sharing can be UE specific COT sharing such that TRP 122-1 can be configured to share the acquired COT according to an association of the UE 110 (e.g., UE 110-1, or 110-2). If the UE 110 is configured to communicate on the cell of TRP 122-2 and TRP 122-1, then the acquired COT can be shared from TRP 122-1 with TRP 122-2 in communicating with the UE 110. In this situation, TRP 122-2 is considered proximate to the TRP-1 based on the UE mTRP configuration of the UE 110, and satisfy the condition that the TRP perform COT sharing be with a nearby AP or TRP. Having proximity of one TRP to another TRP as a condition can decrease a level of interference therebetween. Approximating a level of interference also can be a measure of the proximity to meet a proximity threshold as a condition, for example.

In another aspect, COT sharing via an ideal backhaul can be shared via an X2 signaling. Here, an ideal coordination of the COT can be configured if one TRP acquires the COT, and then he can share the acquired COT through the ideal backhaul without latency via X2 signaling.

The effect of any one aspect herein of COT sharing can be that the UE can simultaneously or concurrently receive TRP transmissions from TRP 122-1 and TRP-2 when the TRPs are enabled to share the COT using the ideal backhaul.

In various aspects, a DCI format 2_0 can include frequency domain resources, time domain resources and power saving features, as well as an additional indication of a control resource set (CoreSet) pool (CoreSetPool) in a CoreSetPool index or indices. The frequency domain resources can include resource block (RB) set indication(s). The time domain resources can include COT duration indication(s). The power saving features can include a search space indication for UE power saving. The additional indication of a CoreSetPool index can be utilized for COT sharing among mTRP.

When the COT is being shared among the TRPs 122 for mTRP communications and the UE 110 monitors a PDCCH for DCI Format 2_0, the UE 110 can receive the resource allocation, the frequency domain allocation, the time domain allocation and Coreset in the Coreset pool index. Here, the time and frequency allocations can be associated with one TRP or both TRPs. Thus, the UE 110 can determine whether COT sharing is being configured or not for monitoring and processing communications with one or mTRPs based on the DCI Format 2_0.

The DCI Format 2_0 can provide an additional indication of CoreSetPool index for COT sharing among mTRP. When COT sharing is indicated to be among mTRP, the UE 110 monitors the configured CoreSetPool for DCI. In one example, if enhancement in DCI Format 2_0 includes an indication of a CoreSetPool and an RB set combination, then the UE 110 can determine that COT sharing is for orthogonal frequency division multiple access (OFDMA) COT sharing and monitor the corresponding transmissions for the TRPs accordingly, either for one or two TRPs based on the DCI Format 2-0 received. The UE 110 can then monitor different CoreSetPool on different frequency resources.

Alternatively, or additionally, if the UE 110 receives the DCI Format 2_0 with different time slots/symbols, and COT sharing can be configured for time division multiple access (TDMA) COT sharing. The UE 110 can then monitor the corresponding transmissions for the TRPs accordingly, either for one or two TRPs based on the DCI Format 2-0 received. The UE 110 can then monitor different CoreSetPool on different time domain resources or different time slots/symbols, for example, and based on the combination determine whether COT sharing is being configured for simultaneous reception/transmissions.

As discussed herein, COT sharing between different TRPs can include the frequency domain or time domain COT sharing. The additional field indication of a CoreSetPool index together with the COT Duration, time domain and frequency domain for RB set allocation in the DCI format 2_0 can indicate to the UE 110 based on different combinations of time domain, frequency domain, or CoreSetPool index whether the resources for COT sharing is on time or frequency, and whether COT sharing is enabled for two TRPs or not for one TRP, and thereby monitor the TRP transmissions correspondingly.

Figure 5:
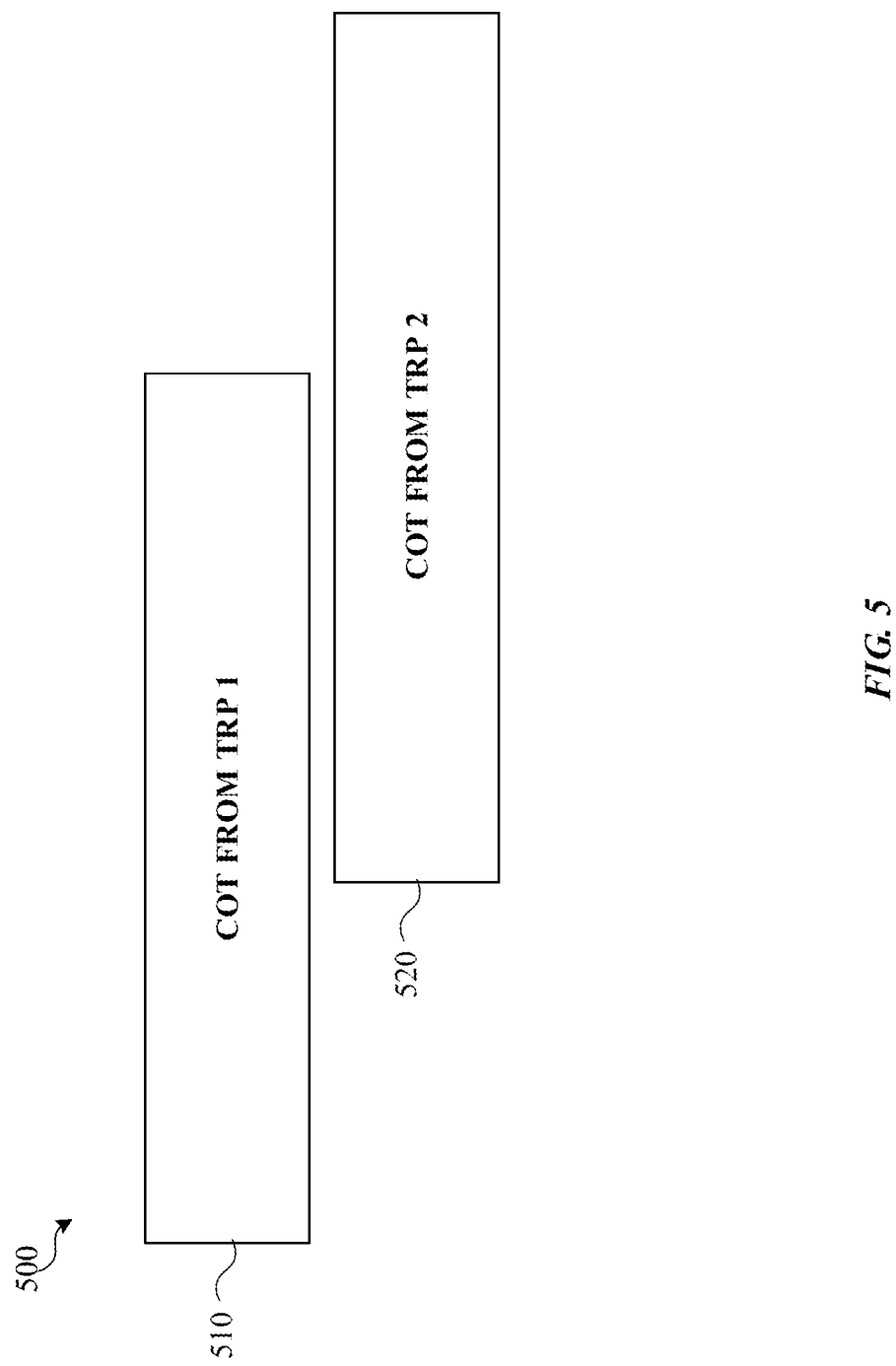
FIG. 5 is an example of COT sharing for multiple transmission reception point (mTRP) communications in accordance with various aspects described.

In other various aspects, COT sharing can be configured via a non-ideal backhaul for mTRPs. Referring to FIG. 5, illustrated is an example COT sharing 500 from different TRPs for mTRP communications according to various aspects or embodiments within this disclosure. In non-ideal backhaul COT sharing, the unlicensed spectrum band can be acquired by the UE 110 or gNB 120 according to LBE or FBE. LBE can include a category 4 (CAT4) LBT with a CCA procedure. Each TRP (e.g., gNB 122-1 and 122-2) can perform the CCA as a part of the LBE independently from one another. In this case the LBE procedures can be completely asynchronous CCA procedures because each TRP preforms their own LBE procedure at 510 and 520. The COTs can be acquired and then shared with a non-ideal backhaul over a certain latency for non-ideal backhaul. Because a COT duration can be in terms of 6 ms or 8 ms, for example, the latency could be longer. In this case, backhaul coordination could not be performed for COT sharing, and rather signaling can only rely on over the air coordination. As such, in this condition, where latency becomes longer, a limitation to the COT sharing itself can be configured so that COT sharing is not performed in such situations where a latency threshold (e.g., about 30 ms latency) is satisfied or exceeded.

In an aspect, DCI can be configured in mTRP via non-ideal backhaul signaling as multiple DCIs or as a single DCI for both TRPs (e.g., 122-1, 122-2). For multiple DCIs being configured for mTRP, two DCI Format 2-0 transmissions 510 and 520 as a part of a COT, for example, can be received by the UE 110 independently as one from each TRP. The separate DCIs can be linked to a separate Corset Pool. Based on the DCI 2_0, the UE 110 can process the CoreSetPool Index to determine what time frequency resource that both TRPs acquired the COT to process and monitor transmissions from both TRPs simultaneously.

The UE 110 can monitor DCI Format 2_0 from each TRP independently. The UE 110, for example, can be configured with a Type 3 common search space (CSS) for each TRP 122-1, 122-2 in order to monitor DCI Format transmission independently. If overlapping in the COT duration, as illustrated, for example, in FIG. 5, the UE 110 can determine that mTRP with COT sharing is configured, otherwise signaling could be considered in a single TRP state without COT sharing. Thus, when the UE 110 receives two DCI Format 2_0, which are linked to separate CoreSetPool Indices, the UE 110 can determine whether there is an overlapping COT duration for COT sharing or not as a single TRP state.

In other aspects, a single DCI can be configured for mTRP, which can include over the air coordination, or a non-ideal backhaul for COT sharing. The UE 110 can have issues here with respect to performing asynchronous CCA procedures. The PDCCH can come from one TRP; however, PDSCH could have issues, especially in subscriber data management or SDM mode, or where TDM/FDM is on the other TRP. The UE 110 could fail to receive transmission where one TRP fails LBT or LBE. In an aspect, a single DCI can be provided for both TRPs to the UE 110 by repeating the transmission over two TRPs. By only soft-combining the DCI transmissions from different TRPs, a decoding performance loss could occur. As such, the UE 110 could first perform blind detection or blind decoding per TRP, and then a soft-combining blind detection. Here, the UE 110 does blind detection first, and then does combining of each TRP transmission being received to do hypothesis testing for determining whether or not the cyclic redundancy check (CRC) passes or not together.

Figure 6:
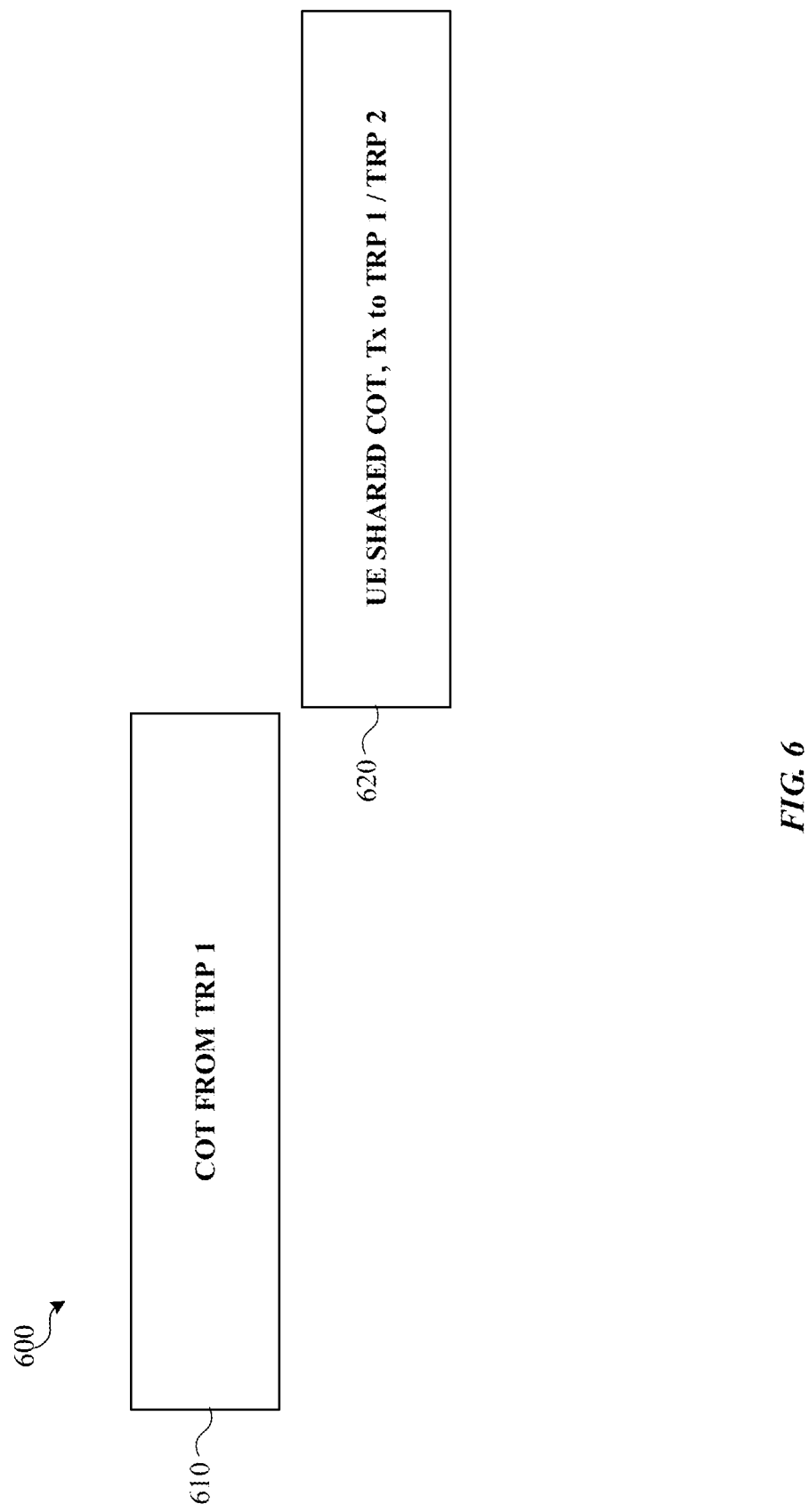
FIG. 6 is another example of COT sharing for mTRP communications in accordance with various aspects described.

Referring to FIG. 6, illustrates an example COT sharing over non-ideal backhaul where the gNB 120, for example, acquires the COT and shares the COT with the UE 110 in accordance with various aspects herein. A gNB 122-1 or 122-2 can acquire the COT via an FBE or LBE, for example, and then attempts to share the COT with the UE 110. In this case, the UE 110 can provide an UL transmission back to the COT owner (e.g., gNB 122-1 or 122-2) or to both TRPs 122-1 and 122-2.

Various aspects can apply to frequency range 1 (FR1), which can be in a 5/6 GHz range, or alternatively to a different frequency range at about 60 GHz range or greater.

For example, for FR1, TRP 1 as TRP 122-1 (or gNB 122-1) can acquire the COT and share it with the UE 110 with DL transmission 610. As a result, the UE 110 can transmit in UL on the shared COT to TRP 122-1, TRP 122-2 (as TRP 2), or both TRP 1 and TRP 2. In one aspect, the UE 110 can be configured to provide the UL transmission back to only TRP 1 as the COT owner TRP.

Alternatively, or additionally, the UE 110 can be configured to provide UL transmission to both TRPs 1 and 2 (e.g., 122-1 and 122-2). The UE 110 can be configured to receive a single DCI for both TRPs, for example, and process the single DCI for both by performing blind detection for each TRP and soft-combining the blind detections to decode the single DCI.

In another aspect, for FR1, the UE 110 can be configured to perform an UL power control for UL transmission based on which TRP the UE is transmitting UL transmission to. As such, the UE 110 can configure UL power in a TRP specific manner for COT sharing operations in FR1. If the UL is to TRP1, then the UE 110 power is specific to follow power related to TRP 1 only. Alternatively, if the UL transmission is to both TRPs, then the power can be controlled following the UE power control from both TRP 122-1 and 122-2. For COT sharing, when the UE 110 is sharing the COT shared by the gNB, the transmission power on the UE side can be limited by the gNB transmission power used to acquire the COT (e.g., TRP 1 or 122-1). However, in general, with gNB COT sharing, the UE Tx power can be lower than the gNB side, and thus, there may not be a need for a limitation in a UL power control algorithm in relation to the maximum UE UL Tx power during COT sharing. The UE 110 can determine whether to implement such a limitation dynamically according to the network or TRPs that are considered in proximity to one another, for example.

In aspects for frequency range at about 60 GHz range or greater (e.g., as a frequency range 3 (FR3) or another nomenclature), the UE 110 can provide UL transmission as PUSCH/PUCCH beam forming transmission to the TRP depending on the antenna configuration in the LBT procedure used to acquire the COT by the TRP 122-1. In response to a directional LBT used at TRP 1 to acquire the COT, for example, the UE 110 can perform a beam forming transmission to the TRP with the associated transmission configuration indicator (TCI) state under the unified TCI framework. When a directional LBT is used at the TRP 1 and TRP 1 and TRP 2 transmit PDCCH based on a multi-DCI or single DCI as discussed herein, the UE can provide a PUSCH/PUCCH transmission to both TRPs with associated TCI states. Alternatively, or additionally, in response to an omni-LBT or an omni-directivity sensing LBT procedure acquires the COT at the TRP 1, no limitation to which TRP is configured and the UE can transmit UL transmission (e.g., PUSCH/PUCCH) to both TRPs 1 and 2. As such, the UE can transmit UL transmission based on the directivity of the LBT procedure of the TRP acquiring the COT for COT sharing with the UE 110 for NR-U communications via a non-ideal backhaul, for example.

Figure 7:
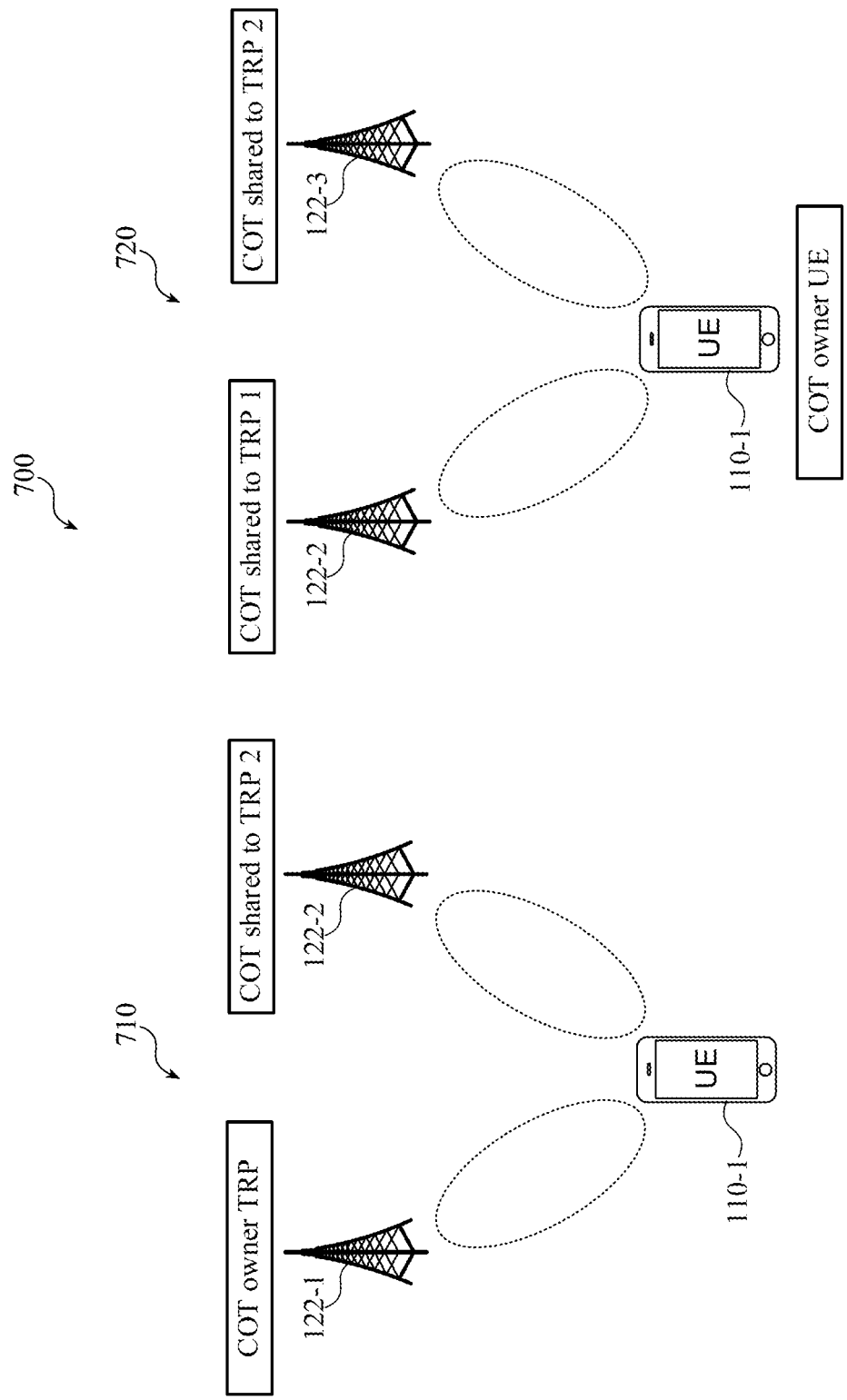
FIG. 7 is an example of COT sharing scenarios for mTRP communications in accordance with various aspects described.

Referring to FIG. 7, illustrated is an example of COT sharing configurations 700 in accordance with various aspects herein. In the left-most scenario 710, TRP 122-1 has acquired the COT as the COT owner as a gNB acquired COT owner. In the right-most scenario 720, the UE 110-1 has acquired the COT as the COT owner.

At scenario 710 where the gNB has acquired the COT. The COT can be shared to the TRP 122-2 for DL communications to the UE 110-1, or shared to the UE 110-1 for UL communications to one or both TRPs. As described above in relation to FIG. 6, when the gNB (e.g., 122-1) acquires the COT for COT sharing in mTRP communications of NR-U, the COT owner can share the COT with the UE for uplink transmission (e.g., PUSCH/PUCCH). The UE 110-1 can utilize the same COT that is acquired by the gNB 122-1 and the UL transmission to the first TRP 122-1, or to both the first TRP 122-1 and the second TRP 122-2 for a FR1 in new radio unlicensed (NR-U) communications. For example, the UE 110-1 can be configured to only provide UL transmission to the COT owner that shares the COT and not both TRPs, which is to TRP 122-1 in this example illustration. Alternatively, or additionally, the UE 110-1 can be configured to transmit UL transmissions to both TRPs 122-1 and 122-2. In this scenario, the UL transmissions can be asynchronized for mTRP and the COT can be shared to the TRP 2 as comprised in gNB 122-2, for example.

Alternatively, or additionally, in scenario 710 the UE 110-1 can be configured to provide UL transmission to both TRPs 1 and 2 (e.g., 122-1 and 122-2). The UE 110 can be configured to receive a single DCI for both TRPs, for example, and process the single DCI for both by performing blind detection for each TRP and soft-combining the blind detections to decode the single DCI. In another aspect, the UE 110-1 can be configured to vary UL power for a UL transmission based on whether the UL transmission is to the first TRP or the second TRP during the sharing of the COT.

For scenario 710, the COT can be acquired by TRP 1 (122-1) in bands of about 60 GHz or greater. In response to being shared to the UE 110-1, the UE 110-1 can provide a UL transmission to the first TRP 122-1 or the second TRP 122-2 based on an associated TCI State in a unified TCI framework in response to a directional LBT being used for sharing/acquiring the COT in NR-U communications with a non-ideal backhaul. The UL transmission from the UE 110-1 can be provided to both the first TRP 122-1 and the second TRP 122-2 when the COT is acquired by an omni-LBT and shared to the UE as well as via the non-ideal backhaul among TRPs.

Additionally, or alternatively, the UE 110-1 can transmit the UL transmission to both the first and the second TRP in response to the directional LBE access procedure being used to receive a downlink physical channel from both the first TRP and the second TRP by multiple downlink control informations (DCIs), respectively, or a single DCI combined by time division multiple access (TDMA) or frequency division multiple access (FDMA).

In scenario 720, the COT owner can be the UE 110-1 in which the COT can be acquired via a CAT4 LBT for UL transmission via a physical uplink channel (e.g., PUSCH). Once the UE acquires the COT, the UE 110-1 can share the COT with the gNBs 122-1, 122-2, or both, which in turn shared the COT to provide downlink transmissions to the UE 110-1. Here, mTRP can be configured for COT sharing via a non-ideal backhaul in FR1 or in 60 GHz range (or greater than 60 GHz).

For the UE acquired COT two separate aspects can be configured in defining NR-U COT sharing where a COT can be shared via a dynamic grant (DG) PUSCH or a configured grant (CG) PUSCH. In FR1, the UE 110-1 can acquire the COT based on a DG for PUSCH indication and in response share the COT with both TRP1 and TRP2. Then TRP1 and TRP2 can transmit PDCCH/PDSCH/RS or other downlink transmission in this UE initiated the COT to the UE 110-1 that acquired the COT. Here, the TRPs can be configured to perform TDM or FDM to share the COT among TRP1 and TRP2 and perform TDM/FDM transmission of the shared COT to the UE that initiated COT sharing.

Alternatively, or additionally, when PUSCH is scheduled with DG (transmitted on configured CoreSet with CoreSetPool info) the PUSCH does COT sharing with the TRP where the DG is sent from. For example, if TRP 122-1 provides the DG to the UE 110-1 for PUSCH, then the UE 110-1 performs sharing of the COT in a limited fashion\ only to the TRP 122-1 that provided the DG. Conversely, if TRP 122-2 provided the DG, then the UE when acquiring the COT would share it to TRP 122-2 only.

For a CG PUSCH, the UE 110-1 can perform its own sensing of the channel to acquire the COT based on the grant (e.g., via CAT4 LBT). In an aspect, the UE 110-1 can share the COT with both TRP1 and TRP2. Alternatively, or additionally, the CG PUSCH can share the COT with a triggering DCI (type 2), as a Type 2 CG PUSCH. Type 1 is an RRC configuration that configures the UE with configured grant transmission and then the UE at the configured times resource performs the Cat 4 LBT to transmit PUSCH. Type 2 is an RRC configuration of the resource with a trigger DCI to activate and deactivate the resources for the CAT4 LBT. Here, the UE 110-1 shared the COT as COT owner with the TRP providing the triggering DCI as a Type 2 CG for PUSCH.

In various other aspects, in bands of 60 GHz or greater, a directional CCA can be performed for sharing the COT for a TRP with an associated TCI state. If an omni-CCA, or multi-beam CCA is used for sensing, then where sensing beam covers both TRP, then COT sharing can be performed with both TRPs for any or all downlink transmissions such as PDCCH/PDSCH/RS mTRP transmission by the TRPs.

In another aspect, when the UE 110-1 is configured with both TRPs, regardless of distance the TRPs can be considered proximate to one another according to the UE mTRP configuration. As such, the TRPs can be shared via an ideal backhaul via X2 signaling as discussed above. Here, the COT sharing is a UE specific COT sharing. Even if the UE 110-1 is not the COT owner, if the UE is configured for communication for both TRPs, the UE can also be considered in a UE mTRP configuration to satisfy the proximity condition for COT sharing between the TRPs and the UE.

In aspect, mTRP can be configured for COT sharing with non-ideal backhaul with Frame Based Equipment Access or FBE for NR-U. With FBE, a frame can be defined (e.g., a 10 ms frame) access sensing can be done at the beginning of the frame. If successful, the network device can transmit for 10 ms; and if not successful, wait for the next 10 ms. 5% of this frame duration can be idle in order to enable access contention and perform channel sensing during the 5% of idle time to compete and obtain the frame for a transmission opportunity as a COT. Support of FBE mTRP can be more easily configured they are time synchronized to a positioning signal or a global positioning signal. A fixed period can then be aligned among mTRPs. Then each TRP can perform a one shot LBT before the start of transmission. Because they are time synchronized between the different mTRPs, a success can be obtained simultaneously in both.

With mTRP with non-ideal backhaul and FBE usage, the UE 110-1 can perform DL detection independently for each TRP 122-1 and 122-2. The UE 110-1 can perform continuous monitoring of transmission from each TRP, based on PDCCH, SS/PBCH, RMSI, GC-PDCCH or other downlink channel that the UE can use to perform DL detection whether the UE acquires the COT or not.

In an aspect, signaling can be performed to indicate COT sharing for mTRP with one TRP or more than one TRP for transmission within the fixed period according to a Remaining Minimum System Information (RMSI) being linked to CoreSetPool Index 0. The UE 110-1 can monitor an RMSI linked to a CoreSetPool Index 0 of a DL transmission to determine whether the first TRP, the second TRP or both the first TRP and the second TRP have acquired the COT in the FBE without continuously monitoring transmissions of the first TRP and the second TRP. This provides a UE power saving benefit compared to a continuous monitoring for both TRPs 122-1, 122-2. If the UE monitors RMSI and the RMSI indicates it is linked to two CoreSet pools, then the UE can determine that this frame has an mTRP transmission and/or both TRP have successes with obtaining the frame(s) or COT. Then the UE 110-1 can continue to perform mTRP transmission receiving without continuing monitoring from each TRP for valid DL transmission.

Alternatively, or additionally, the CoreSetPool Index discussed herein can be replaced by a physical layer cell identifier (PCI) for conveying indications of COT sharing for mTRP as discussed herein. The PCI can thus be utilized to enable feMIMO TRP to TRP coordination and configure the RMSI without difficulty or issue.

In other aspects, coordination information can be carried by either a DCI or an uplink control information (UCI) between TRPs. The owner TRP (e.g., TRP 1 or gNB 122-1) can share the COT with the other TRP 2 by transmitting a DCI to TRP 2. In turn, TRP 2 receives/process the DCI from TRP 1 in order to determine that the COT is being shared and resources for sharing the COT. Thus, TRP 2 can be configured to operate in a similar manner as the UE 110 for COT sharing in that it receives DCI. The TRP 2 can receive the DCI when performing sensing of the channel. Alternatively, or additionally, the COT owner (e.g., TRP 1 or TRP 122-1) can share the COT using a UCI. The COT owner being TRP 1, for example, could also operate in a similar fashion as the UE 110-1 by providing UL transmission to the TRP 2 (or TRP/gNB 122-2) for sharing the COT and receive the UCI as an over the air coordination, for example.

Figure 8:
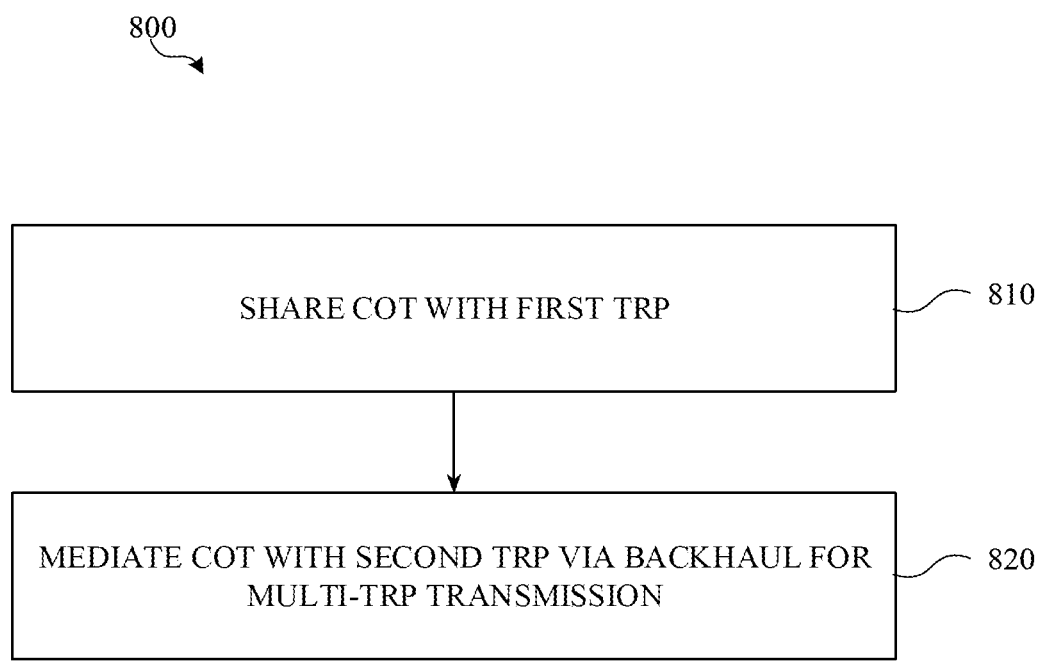
FIG. 8 is an example process flow of COT sharing for mTRP communications in accordance with various aspects described.

Referring to FIG. 8, illustrated is an example process flow 800 for enhancing mTRP transmission in accordance with various aspects described herein. Process flow 800 can be performed via a gNB, UE or other network device by one or more processors or processing circuitry as described herein.

Process flow 800 initiates at 810 for sharing the COT with a first TRP (or a second TRP), which can include acquiring the COT either at the first TRP (or second TRP) or a UE by a CCA, LBT, LBE or FBE depending on the band for NR-U to enable mTRP transmissions. At 820, process flow 800 further comprises mediating the COT with a second TRP via a backhaul (e.g., an ideal backhaul, or a non-ideal backhaul) or an over the air coordination scheme, as described herein. For example, an X2 signaling can be used for sharing the COT to another TRP. The mediation can include providing an indication or resources for sharing the COT to enable proper monitoring and use of the COT sharing. This can be condition on a proximity condition such as whether the other TRP is consider proximate to the COT owner. For example, if another TRP is configured with the UE for communication, then the proximity condition could be satisfied for that TRP based on the UE mTRP configuration. The proximity condition therefore comprises a multi-TRP configuration of the UE with the first TRP, the second TRP, or both the first TRP and the second TRP, and any TRP communicatively coupled to the UE could be considered proximate or not.

In an aspect, process flow 800 can include determining whether the COT is being shared among both the first TRP and the second TRP in a multi-TRP configuration by monitoring a CoreSetPool for a DCI based on a CoreSetPool Index of a DCI format 2_0.

In another aspect, the process flow 800 can include causing to monitor or monitoring a CoreSetPool configured for a single DCI or multiple DCIs for the COT sharing with multi-TRPs based on a combination of at least one of: a time domain resource or a frequency domain resource, and a CoreSetPool Index in a DCI Format 2_0 or a physical layer indicator (PCI). A multi-TRP configuration state can be determined when a first DCI is received from the first TRP and a second DCI is received from the second TRP by monitoring a DCI format independently for the first TRP and the second TRP based on different Type 3 common search spaces (CSS)s, respectively. A soft combining of blind decoding for downlink transmissions of the first TRP and the second TRP, wherein the multi-TRP configuration state comprises TRP transmissions with the first TRP, the second TRP, or both the first TRP and the second TRP.

While the methods are illustrated and described above as a series of acts or events, it will be appreciated that the illustrated ordering of such acts or events are not to be interpreted in a limiting sense. For example, some acts can occur in different orders or concurrently with other acts or events apart from those illustrated or described herein. In addition, not all illustrated acts can be required to implement one or more aspects or examples of the disclosure herein. Also, one or more of the acts depicted herein can be carried out in one or more separate acts or phases. In some examples, the methods illustrated above can be implemented in a computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an baseband processor, configured to: share a channel occupancy time (COT) for communication with a first transmission reception point (TRP) and mediate the COT with a second TRP via a backhaul link based on one or more conditions for sharing of the COT.

A second example can include the first example, wherein the one or more conditions comprise a proximity condition based on a user equipment (UE) multi-TRP configuration and X2 signaling via an ideal backhaul.

A third example can include the first or second example, further configured to: mediate the COT based on an indication of a downlink control information (DCI) Format 2_0 to configure COT sharing among one or multi-TRPs.

A fourth example can include any one or more of the first through third examples, wherein the DCI Format 2_0 comprises at least one of: an available resource block (RB) set indication, a COT duration, and a search space indication, and an indication of a control resource set (CoreSet) pool (CoreSetPool) index, and the baseband processor is further configured to determine whether the COT sharing is among one TRP or multi-TRPs based on the DCI Format 2_0.

A fifth example can include any one or more of the first through fourth examples, further configured to: enable a user equipment (UE) to monitor a CoreSetPool configured for a single DCI or multiple DCIs for the COT sharing with multi-TRPs based on a combination of at least one of: a time domain resource or a frequency domain resource, and a CoreSetPool Index of the DCI Format 2_0.

A sixth example can include any one or more of the first through fifth examples, further configured to: perform a first clear channel assessment (CCA) associated with the first TRP and a second CCA associated with the second TRP via a non-ideal backhaul in an asynchronous manner in relation to one another, wherein the first CCA and the second CCA comprises a load based equipment (LBE) access scheme for a new radio unlicensed (NR-U) spectrum.

A seventh example can include any one or more of the first through sixth examples, further configured to: monitor a DCI format independently for the first TRP and the second TRP based on different Type 3 common search spaces (CSS)s, respectively; and determine a multi-TRP configuration state based on whether a first DCI received from the first TRP and a second DCI received from the second TRP at least partially overlap in a COT duration, wherein the multi-TRP configuration state comprises TRP transmissions with the first TRP, the second TRP, or both the first TRP and the second TRP.

An eighth example can include any one or more of the first through seventh examples, further configured to: monitor a single DCI repeated over the first TRP and the second TRP; and performing a blind detection of transmissions of the first TRP and the second TRP and a soft-combining of the single DCI for the first TRP and the second TRP.

A ninth example can include any one or more of the first through eighth examples, further configured to: vary an uplink (UL) power for an UL transmission based on whether the UL transmission is to the first TRP or the second TRP during the sharing of the COT; and provide the UL transmission to the first TRP, or to both the first TRP and the second TRP, for a frequency range 1 (FR1) in new radio unlicensed (NR-U) communications.

A tenth example can include any one or more of the first through ninth examples, wherein the baseband processor is further configured to: provide a UL transmission to the first TRP or the second TRP based on an associated transmission control indicator (TCI) State in a unified TCI framework in response to the COT being acquired when a directional LBT is used for sharing the COT in NR-U communications of about 60 GHz via a non-ideal backhaul; and provide the UL transmission to the first TRP and the second TRP in response to acquiring the COT when an omni-LBT is used for sharing the COT via the non-ideal backhaul.

An eleventh example can include any one or more of the first through tenth examples, wherein baseband processor is further configured to: acquire the COT comprising a UE acquired COT in response to receiving a dynamic grant (DG) for a physical uplink shared channel (PUSCH) with a category 4 (CAT4) Listen Before Talk (LBT) operation and share the COT to the first TRP and the second TRP via a non-ideal backhaul to receive one or more downlink (DL) transmissions over the COT from the first TRP and the second TRP based on time division multiplexing (TDM) or frequency division multiplexing (FDM), or acquire the COT comprising the UE acquired COT in response to receiving the DG for the PUSCH with the CAT4 LBT operation on a CoreSet comprising CoreSet Pool information and share the COT with only the first TRP or the second TRP that provided the DG PUSCH.

An twelfth example can include any one or more of the first through eleventh examples, further configured to: perform a downlink (DL) detection independently for the first TRP and the second TRP by continuously monitoring transmissions based on a physical downlink (DL) transmission for new radio unlicensed (NR-U) communication from a frame based equipment (FBE) access, or monitor a Remaining Minimum System Information (RMSI) linked to a CoreSetPool Index 0 of a DL transmission to determine whether the first TRP, the second TRP or both the first TRP and the second TRP have acquired the COT in the FBE without continuously monitoring transmissions of the first TRP and the second TRP.

A thirteenth example can be a user equipment (UE) comprising: a memory; and a processor configured to: acquire or share a channel occupancy time (COT) for a first transmission reception point (TRP); and mediate the COT with a second TRP for sharing the COT via a backhaul link based on a proximity condition for sharing the COT.

A fourteenth example can include the thirteenth example, wherein the proximity condition comprises a multi-TRP configuration of the UE with the first TRP, the second TRP, or both the first TRP and the second TRP.

A fifteenth example can include any one or more of the thirteenth through fourteenth examples, wherein the processor is further configured to: determine whether the COT is being shared among both the first TRP and the second TRP in a multi-TRP configuration by monitoring a control resource set (CoreSet) pool (CoreSetPool) for a downlink control information (DCI) based on a CoreSetPool Index of a DCI format 2_O.

A sixteenth example can include any one or more of the thirteenth through fifteenth examples, wherein the processor is further configured to: monitor a CoreSetPool configured for a single DCI or multiple DCIs for the COT sharing with multi-TRPs based on a combination of at least one of: a time domain resource or a frequency domain resource, and a CoreSetPool Index in a DCI Format 2_0 or a physical layer indicator (PCI).

A seventeenth example can include any one or more of the thirteenth through sixteenth examples, wherein the processor is further configured to: determine a multi-TRP configuration state when a first DCI is received from the first TRP and a second DCI is received from the second TRP by monitoring a DCI format independently for the first TRP and the second TRP based on different Type 3 common search spaces (CSS)s, respectively, and by performing a soft combining of blind decoding for downlink transmissions of the first TRP and the second TRP, wherein the multi-TRP configuration state comprises TRP transmissions with the first TRP, the second TRP, or both the first TRP and the second TRP.

An eighteenth example can include any one or more of the thirteenth through seventeenth examples, wherein the processor is further configured to: determine an uplink (UL) power for a UL transmission based on whether the UL transmission is to the first TRP or the second TRP during the sharing of the COT when the first TRP acquires the COT and is share to the UE for a frequency range 1 (FR1).

A nineteenth example can include any one or more of the thirteenth through eighteenth examples, wherein the processor is further configured to: transmit an UL transmission to the first TRP or the second TRP based on an associated transmission control indicator (TCI) state under a unified TCI framework in response to a directional Load Based Equipment (LBE) access procedure being used to acquire the COT at the first TRP or the second TRP for a 60 GHz or greater band with a Listen Before Talk (LBT) procedure; and transmit the UL transmission to both the first and the second TRP in response to the directional LBE access procedure being used to receive a downlink physical channel from both the first TRP and the second TRP by multiple downlink control informations (DCIs), respectively, or a single DCI combined by time division multiple access (TDMA) or frequency division multiple access (FDMA).

A twentieth example can include any one or more of the thirteenth through nineteenth examples, wherein the processor is further configured to: acquire the COT based on a configured grant (CG) for a physical uplink shared channel (PUSCH); and share the COT to the first TRP and the second TRP based on the CG for the PUSCH, or share the COT with the first TRP or the second TRP based on a triggering DCI of a Type 2 CG PUSCH.

A twenty-first example can include any one or more of the thirteenth through twentieth examples, wherein the processor is further configured to: in response to acquiring the COT in a 60 GHz or greater band with a directional clear channel assessment (CCA), sharing the COT with the first TRP or the second TRP based on an associated TCI state; and in response to acquiring the COT in the 60 GHz or greater band with an omni-CCA or a multi-beam CCA where sensing a beam covers the first TRP and the second TRP, sharing the COT with both the first TRP and the second TRP for a downlink multi-TRP transmission.

A twenty-second example can be a base station, comprising: a memory; and a processor configured to: share or acquire a channel occupancy time (COT) for communication with a first transmission reception point (TRP) or a user equipment (UE); and mediate the COT with a second TRP via a non-ideal backhaul or an ideal backhaul based on one or more conditions for sharing of the COT.

A twenty-third example can include the twenty-second example, wherein the processor is further configured to: share the COT with the second TRP from the first TRP via a X2 signaling over an X2 interface, wherein the one or more conditions comprise a proximity condition based on a user equipment (UE) multi-TRP configuration.

A twenty-fourth example can include any one or more of the twenty-second through twenty-third examples, wherein the processor is further configured to: transmit a control resource set (CoreSet) pool (CoreSetPool) index in a downlink control information (DCI) Format 2_0 that indicates whether the COT sharing is associated with one or multi-TRPs, wherein the DCI Format 2_0 enables the UE to monitor different CoreSetPools on different frequency resources for orthogonal frequency division multiple access (OFDMA) COT sharing based on an RB set and a CoreSetPool indicated by the DCI Format 2_0, or enables the UE to monitor the different CoreSetPools on different time slots for time division multiple access (TDMA) COT sharing based on time slots/symbols and the CoreSetPool indicated by the DCI Format 2_0.

A twenty-fifth example can include any one or more of the twenty-second through twenty-fourth examples, wherein the processor is further configured to: acquire the COT for a frequency range 1 (FR1) or a 60 GHz or greater band; and share the COT with the UE based on a single DCI for the first TRP and the second TRP or different DCIs for the first TRP and the second TRP.

A twenty-sixth example can include any one or more of the twenty-second through twenty-fifth examples, wherein the processor is further configured to: align a fixed period among multi-TRPs; and provide a Remaining Minimum System Information (RMSI) linked to a CoreSetPool Index 0 to determine whether the first TRP, the second TRP or both the first TRP and the second TRP have acquired the COT.

A twenty-seventh example can include any one or more of the twenty-second through twenty-sixth examples, wherein the processor is further configured to: process coordination information for COT sharing over an air interface by providing a downlink control information (DCI) to the second TRP or receiving uplink control information (UCI) from the second TRP based on whether the COT is acquired at the first TRP or the second TRP.

A twenty-eighth example can include an apparatus comprising a method or means for executing any of the described operations of the first example through the thirty-eighth example.

A twenty-ninth example can include a machine readable medium that stores instructions for execution by a processor to perform any of the described operations of the first example through the thirty-eighth example.

A thirtieth example can include a baseband processor comprising: a memory interface; and processing circuitry configured to: perform any of the described operations of the first example through the thirty-eighth example.

A thirty-first example can include a User Equipment (UE) configured to execute any of the described operations of the first example through the thirty-eighth example.

A method that includes any action or combination of actions as substantially described herein in the Detailed Description.

A method as substantially described herein with reference to each or any combination of the Figures included herein or with reference to each or any combination of paragraphs in the Detailed Description.

A user equipment configured to perform any action or combination of actions as substantially described herein in the Detailed Description as included in the user equipment.

A network node configured to perform any action or combination of actions as substantially described herein in the Detailed Description as included in the network node.

A non-volatile computer-readable medium that stores instructions that, when executed, cause the performance of any action or combination of actions as substantially described herein in the Detailed Description.

Moreover, various aspects or features described herein can be implemented as a method, apparatus, or article of manufacture using standard programming or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction(s) or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes or actions of a method or algorithm can reside as one or any combination or set of codes or instructions on a machine-readable medium or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband circuitry comprising:
 a processor; and
 a memory storing instructions that, when executed by the processor, cause the processor to:
  share a channel occupancy time (COT) for communication with a first transmission reception point (TRP);
  mediate the COT with a second TRP via a backhaul link based on one or more conditions for sharing of the COT;
  monitor a downlink control information (DCI) format independently for the first TRP and the second TRP based on different Type 3 common search spaces (CSSs), respectively; and
  determine a multi-TRP configuration state based on whether a first DCI received from the first TRP and a second DCI received from the second TRP at least partially overlap in a COT duration, wherein the multi-TRP configuration state comprises TRP transmissions with the first TRP, the second TRP, or both the first TRP and the second TRP.

2. The baseband circuitry of claim 1, wherein the one or more conditions comprise a proximity condition based on a user equipment (UE) multi-TRP configuration and X2 signaling via an ideal backhaul.

3. The baseband circuitry of claim 1, wherein the instructions further cause the processor to:
 mediate the COT based on an indication of a DCI Format 2_0 to configure COT sharing among one or multi-TRPs.

4. The baseband circuitry of claim 3, wherein the DCI Format 2_0 comprises at least one of: an available resource block (RB) set indication, a COT duration, and a search space indication, and an indication of a control resource set (CoreSet) pool (CoreSetPool) index, and the instructions further cause the processor to determine whether the COT sharing is among one TRP or multi-TRPs based on the DCI Format 2_0.

5. The baseband circuitry of claim 3, wherein the instructions further cause the processor to:
 enable a user equipment (UE) to monitor a CoreSetPool configured for a single DCI or multiple DCIs for the COT sharing with multi-TRPs based on a combination of at least one of: a time domain resource or a frequency domain resource, and a CoreSetPool Index of the DCI Format 2_0.

6. The baseband circuitry of claim 1, wherein the instructions further cause the processor to:
 perform a first clear channel assessment (CCA) associated with the first TRP and a second CCA associated with the second TRP via a non-ideal backhaul in an asynchronous manner in relation to one another, wherein the first CCA and the second CCA comprises a load based equipment (LBE) access scheme for a new radio unlicensed (NR-U) spectrum.

7. The baseband circuitry of claim 1, wherein the instructions further cause the processor to:
 monitor a single DCI repeated over the first TRP and the second TRP; and
 perform a blind detection of transmissions of the first TRP and the second TRP and a soft-combining of the single DCI for the first TRP and the second TRP.

8. The baseband circuitry of claim 1, wherein the instructions further cause the processor to:
 vary an uplink (UL) power for an UL transmission based on whether the UL transmission is to the first TRP or the second TRP during the sharing of the COT; and
 provide the UL transmission to the first TRP, or to both the first TRP and the second TRP, for a frequency range 1 (FR1) in new radio unlicensed (NR-U) communications.

9. The baseband circuitry of claim 1, wherein the instructions further cause the processor to:
 provide a UL transmission to the first TRP or the second TRP based on an associated transmission control indicator (TCI) State in a unified TCI framework in response to the COT being acquired when a directional listen before talk (LBT) is used for sharing the COT in NR-U communications of about 60 GHz via a non-ideal backhaul; and
 provide the UL transmission to the first TRP and the second TRP in response to acquiring the COT when an omni-LBT is used for sharing the COT via the non-ideal backhaul.

10. The baseband circuitry of claim 1, wherein the instructions further cause the processor to acquire at least one of:
 the COT comprising a user equipment (UE) acquired COT in response to receiving a dynamic grant (DG) for a physical uplink shared channel (PUSCH) with a category 4 (CAT4) Listen Before Talk (LBT) operation and share the COT to the first TRP and the second TRP via a non-ideal backhaul to receive one or more downlink (DL) transmissions over the COT from the first TRP and the second TRP based on time division multiplexing (TDM) or frequency division multiplexing (FDM), or the COT comprising the UE acquired COT in response to receiving the DG for the PUSCH with the CAT4 LBT operation on a CoreSet comprising CoreSet Pool information and share the COT with only the first TRP or the second TRP that provided the DG PUSCH.

11. The baseband circuitry of claim 1, wherein the instructions further cause the processor to:
perform a downlink (DL) detection independently for the first TRP and the second TRP by continuously monitoring transmissions based on a physical DL transmission for new radio unlicensed (NR-U) communication from a frame based equipment (FBE) access, or monitor a Remaining Minimum System Information (RMSI) linked to a CoreSetPool Index 0 of a DL transmission to determine whether the first TRP, the second TRP or both the first TRP and the second TRP have acquired the COT in the FBE without continuously monitoring transmissions of the first TRP and the second TRP.

12. A user equipment (UE) comprising:
a processor; and
a memory storing instructions that, when executed by the processor, cause the processor to:
acquire or share a channel occupancy time (COT) for a first transmission reception point (TRP) based on a configured grant (CG) for a physical uplink shared channel (PUSCH);
mediate the COT with a second TRP for sharing the COT via a backhaul link based on a proximity condition for sharing the COT; and
share the COT with the first TRP and the second TRP based on the CG for the PUSCH, or with the first TRP or the second TRP based on a triggering downlink control information (DCI) of a Type 2 CG PUSCH.

13. The UE of claim 12, wherein the proximity condition comprises a multi-TRP configuration of the UE with the first TRP, the second TRP, or both the first TRP and the second TRP.

14. The UE of claim 12, wherein the instructions further cause the processor to:
determine whether the COT is being shared among both the first TRP and the second TRP in a multi-TRP configuration by monitoring a control resource set (CoreSet) pool (CoreSetPool) for a DCI based on a CoreSetPool Index of a DCI format 2_0.

15. The UE of claim 12, wherein the instructions further cause the processor to:
monitor a CoreSetPool configured for a single DCI or multiple DCIs for the COT sharing with multi-TRPs based on a combination of at least one of: a time domain resource or a frequency domain resource, and a CoreSetPool Index in a DCI Format 2_0 or a physical layer indicator (PCI).

16. The UE of claim 12, wherein the instructions further cause the processor to:
determine a multi-TRP configuration state when a first DCI is received from the first TRP and a second DCI is received from the second TRP by monitoring a DCI format independently for the first TRP and the second TRP based on different Type 3 common search spaces (CSSs), respectively, and by performing a soft combining of blind decoding for downlink transmissions of the first TRP and the second TRP, wherein the multi-TRP configuration state comprises TRP transmissions with the first TRP, the second TRP, or both the first TRP and the second TRP.

17. The UE of claim 12, wherein the instructions further cause the processor to:
determine an uplink (UL) power for a UL transmission based on whether the UL transmission is to the first TRP or the second TRP during the sharing of the COT when the first TRP acquires the COT and the COT is shared to the UE for a frequency range 1 (FR1).

18. The UE of claim 12, wherein the instructions further cause the processor to:
transmit an UL transmission to the first TRP or the second TRP based on an associated transmission control indicator (TCI) state under a unified TCI framework in response to a directional Load Based Equipment (LBE) access procedure being used to acquire the COT at the first TRP or the second TRP for a 60 GHz or greater band with a Listen Before Talk (LBT) procedure; and
transmit the UL transmission to both the first and the second TRP in response to the directional LBE access procedure being used to receive a downlink physical channel from both the first TRP and the second TRP by multiple downlink control informations (DCIs), respectively, or a single DCI combined by time division multiple access (TDMA) or frequency division multiple access (FDMA).

19. The UE of claim 12, wherein the instructions further cause the processor to:
in response to acquiring the COT in a 60 GHz or greater band with a directional clear channel assessment (CCA), share the COT with the first TRP or the second TRP based on an associated transmission control indicator (TCI) state; and
in response to acquiring the COT in the 60 GHz or greater band with an omni-CCA or a multi-beam CCA where sensing a beam covers the first TRP and the second TRP, share the COT with both the first TRP and the second TRP for a downlink multi-TRP transmission.

20. A base station, comprising:
a processor; and
a memory storing instructions that, when executed by the processor, cause the processor to:
share or acquire a channel occupancy time (COT) for communication with a first transmission reception point (TRP) or a user equipment (UE);
mediate the COT with a second TRP via a non-ideal backhaul or an ideal backhaul based on one or more conditions for sharing of the COT; and
transmit a control resource set (CoreSet) pool (CoreSetPool) index in a downlink control information (DCI) Format 2_0 that indicates whether the COT sharing is associated with one or multi-TRPs, wherein the DCI Format 2_0 enables the UE to monitor different CoreSetPools on different frequency resources for orthogonal frequency division multiple access (OFDMA) COT sharing based on a resource block RB) set and a CoreSetPool indicated by the DCI Format 2_0, or enables the UE to monitor the different CoreSetPools on different time slots for time division multiple access (TDMA) COT sharing based on time slots/symbols and the CoreSetPool indicated by the DCI Format 2_0.

21. The base station of claim 20, wherein the instructions further cause the processor to:
share the COT with the second TRP from the first TRP via a X2 signaling over an X2 interface, wherein the one or more conditions comprise a proximity condition based on a UE multi-TRP configuration.

22. The base station of claim 20, wherein the instructions further cause the processor to:
   acquire the COT for a frequency range 1 (FR1) or a 60 GHz or greater band; and
   share the COT with the UE based on a single DCI for the first TRP and the second TRP or different DCIs for the first TRP and the second TRP.

23. The base station of claim 20, wherein the instructions further cause the processor to:
   align a fixed period among multi-TRPs; and
   provide a Remaining Minimum System Information (RMSI) linked to a CoreSetPool Index 0 to determine whether the first TRP, the second TRP or both the first TRP and the second TRP have acquired the COT.

24. The base station of claim 20, wherein the instructions further cause the processor to:
   process coordination information for COT sharing over an air interface by providing a DCI to the second TRP or receiving uplink control information (UCI) from the second TRP based on whether the COT is acquired at the first TRP or the second TRP.

\* \* \* \* \*